US012646007B2

(12) United States Patent
Saha et al.

(10) Patent No.: US 12,646,007 B2
(45) Date of Patent: Jun. 2, 2026

(54) AUGMENTATION OF MACHINE LEARNING PIPELINE CORPUS FOR SYNTHESIZING NEW MACHINE LEARNING PIPELINES

(71) Applicant: FUJITSU LIMITED, Kawasaki-shi (JP)

(72) Inventors: Ripon Saha, Pleasanton, CA (US); Mukul Prasad, San Jose, CA (US); Linyi Li, Urbana, IL (US)

(73) Assignee: Fujitsu Limited, Kawasaki (JP)

( * ) Notice: Subject to any disclaimer, the term of this patent is extended or adjusted under 35 U.S.C. 154(b) by 934 days.

(21) Appl. No.: 17/657,621

(22) Filed: Mar. 31, 2022

(65) Prior Publication Data

US 2023/0080439 A1    Mar. 16, 2023

Related U.S. Application Data

(60) Provisional application No. 63/260,908, filed on Sep. 3, 2021.

(51) Int. Cl.
G06N 20/20 (2019.01)
G06F 8/41 (2018.01)
(Continued)

(52) U.S. Cl.
CPC .............. G06N 20/20 (2019.01); G06F 8/427 (2013.01); G06F 8/65 (2013.01); G06F 9/547 (2013.01); G06F 11/3495 (2013.01); G06N 3/08 (2013.01)

(58) Field of Classification Search
CPC .......... G06N 20/00; G06N 20/20; G06N 5/01; G06N 3/105; G06F 8/35; G06F 8/36;
(Continued)

(56) References Cited

U.S. PATENT DOCUMENTS 10,824,940 B1 * 11/2020 Rybakov .................. G06N 7/01
2020/0234162 A1    7/2020 Jayaraman et al.
(Continued)

FOREIGN PATENT DOCUMENTS

CN       110110858 A       8/2019
CN       111506396 A       8/2020
(Continued)

OTHER PUBLICATIONS

D. Laadan et al.: "RankML: a meta learning-based approach for pre-ranking machine learning pipelines", arvix.org, Cornell University Library, Nov. 20, 2019, 8 pages.
(Continued)

*Primary Examiner* — Geoffrey R St Leger
(74) *Attorney, Agent, or Firm* — Fujitsu Intellectual Property Center

(57) ABSTRACT

According to an aspect of an embodiment, operations may include receiving an ML project stored in an ML corpus database. The operations may further include mutating a first ML pipeline, of a set of first ML pipelines associated with the received ML project, to determine a set of second ML pipelines. The mutation of the first ML pipeline may correspond to a substitution of a first ML model associated with the first ML pipeline with a second ML model associated with one of the set of predefined ML pipelines. The operations may further include selecting one or more ML pipelines from the set of second ML pipelines based on a performance score associated with each of the determined set of ML pipelines. The operations may further include augmenting the ML corpus database to include the selected one or more ML pipelines and the set of first ML pipeline.

18 Claims, 12 Drawing Sheets

(51) Int. Cl.
| | |
|---|---|
| *G06F 8/65* | (2018.01) |
| *G06F 9/54* | (2006.01) |
| *G06F 11/34* | (2006.01) |
| *G06N 3/08* | (2023.01) |

(58) Field of Classification Search
CPC ... G06F 8/427; G06F 8/74; G06F 8/75; G06F
9/547; G06F 11/3495
See application file for complete search history.

(56) References Cited

U.S. PATENT DOCUMENTS

| | | | | |
|---|---|---|---|---|
| 2020/0265324 | A1* | 8/2020 | Ferreira Moreno ... | G06N 5/022 |
| 2020/0272909 | A1* | 8/2020 | Parmentier ............ | G06N 3/126 |
| 2020/0401950 | A1* | 12/2020 | Han ........................ | G06N 20/20 |
| 2022/0413814 | A1* | 12/2022 | Mukherjee ................ | G06F 8/34 |

FOREIGN PATENT DOCUMENTS

| | | | | | |
|---|---|---|---|---|---|
| EP | | 3779806 | A1 * | 2/2021 | ............ G06N 20/20 |
| JP | | 2020-530634 | A | 10/2020 | |
| JP | | 2021-2315 | A | 1/2021 | |

OTHER PUBLICATIONS

M. Mukesh et al.: "Eve: a virtual data scientist (D3M/Eve)", Technical Report of the Air Force Research Laboratory, No. AFRL-RI-RS-TR-2019-077, Apr. 2019 (Retrieved from the Internet: URL:https;//apps.dtic.mil/pdfs/AD1069846.pdf [retrieved om Nov. 21, 2022], 34 pages.

Z. Shang et al.: "Democratizing Data Science Through Interactive Curation of ML Pipelines," Designing Interactive Systems Conference, Jun. 25, 2019, pp. 1171-1188.

European Patent Office (EPO) Extended European Search Report with CF Form 1507 mailed in connection with counterpart European Patent Application No. 22188261, on Dec. 5, 2022, 8 pages. * cited documents XP058451066 and XP058622499, were previously cited and submitted herein in an IDS dated Aug. 2, 2022 *.

Matthias Feurer, Aaron Klein, Katharina Eggensperger, Jost Springenberg, Manuel Blum, and Frank Hutter, "Efficient and robust automated machine learning," In Advances in Neural Information Processing Systems, 2015, 9 pages.

Randal S Olson, Nathan Bartley, Ryan J Urbanowicz, and Jason H Moore. 2016. "Evaluation of a tree-based pipeline optimization tool for automating data science," In Proceedings of the 2016 on Genetic and Evolutionary Computation Conference. ACM, 205, pp. 485-492.

Cambronero José P., and Martin C. Rinard. "AL: autogenerating supervised learning programs." Proceedings of the ACM on Programming Languages vol. 3, No. OOPSLA, Article 175 (2019):1-28.

José Cambronero, Jürgen Cito, Martin Rinard (2020). AMS: Generating AutoML search spaces from weak specifications. In Proceedings of ESEC/FSE 2020, pp. 763-774.

Gao X., Saha, R.K., Prasad, M.R. and Roychoudhury, A., Oct. 2020, Fuzz testing based data augmentation to improve robustness of deep neural networks. In 2020 IEEE/ACM 42nd International Conference on Software Engineering (ICSE), 2020, pp. 1147-1158.

Taylor Luke, and Geoff Nitschke. "Improving deep learning with generic data augmentation." In 2018 IEEE Symposium Series on Computational Intelligence (SSCI), IEEE, 2018, pp. 1542-1547.

Wei Jason, and Kai Zou. "EDA: Easy Data Augmentation Techniques for Boosting Performance on Text Classification Tasks." In Proceedings of the 2019 Conference on Empirical Methods in Natural Language Processing and the 9th International Joint Conference on Natural Language Processing (EMNLP-IJCNLP), 2019, pp. 6382-6388.

Chinese Office Action issued Nov. 29, 2025 for corresponding Chinese Patent Application No. 202211064368.5, 21 pages, with English Translation. *Please note US-2020272909-A1 and US-2020401950-A1 were previously cited on Jul. 28, 2025*.

Japanese Office Action mailed Apr. 14, 2026 for corresponding Japanese Patent Application No. 2022-136537, with Partial English Translation, 3 pages. Jul. 28, 2025. *Please note US-2020/027909-A1 and NPL Laadan, Doron et al., "RankML: Meta Learning-Based Approach for Pre-Ranking Machine Learning Pipelines" were previously cited on Jul. 28, 2025 and Mar. 6, 2023, respectively*.

* cited by examiner

200

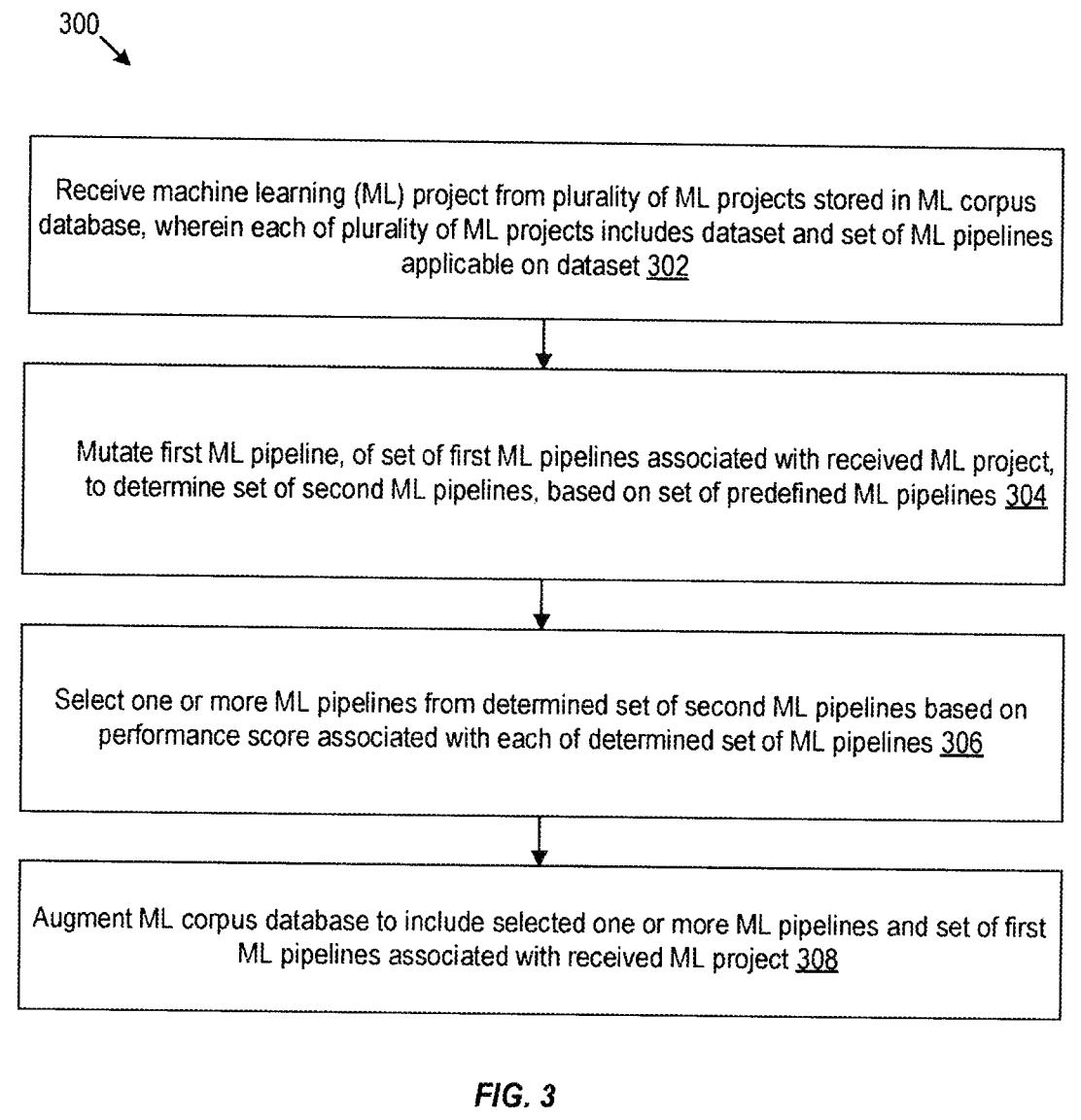

300

Receive machine learning (ML) project from plurality of ML projects stored in ML corpus database, wherein each of plurality of ML projects includes dataset and set of ML pipelines applicable on dataset 302

Mutate first ML pipeline, of set of first ML pipelines associated with received ML project, to determine set of second ML pipelines, based on set of predefined ML pipelines 304

Select one or more ML pipelines from determined set of second ML pipelines based on performance score associated with each of determined set of ML pipelines 306

Augment ML corpus database to include selected one or more ML pipelines and set of first ML pipelines associated with received ML project 308

*FIG. 3*

400

Identify code snippet of first ML model associated with first ML pipeline 402

Determine one or more input parameters associated with identified code snippet 404

Select second ML model from set of predefined models associated with set of predefined ML pipelines 406

Instantiate selected second ML model based on substitution of first ML model with selected second ML model in first ML pipeline 408

*FIG. 4*

600B logm3 = sm.GLM(y_train, X_train_sm, family = sm.families.Binomial()) —— 624
res = logm3.fit() —— 626
620 from sklearn.ensemble import RandomForestRegressor —— 628
logm3 = RandomForestRegressor() —— 630
res = logm3.fit(X_train_sm, y_train) —— 632
622

700

Select predefined template associated with second ML model, wherein selected predefined template is annotated with one or more input parameters of identified code snippet of first ML model 702

Construct code snippet of second ML model based on parameterization of one or more function calls in selected predefined template using annotated one or more input parameters 704

Replace identified code snippet of first ML model with constructed code snippet of second ML model to instantiate second ML model 706

*FIG. 7*

800
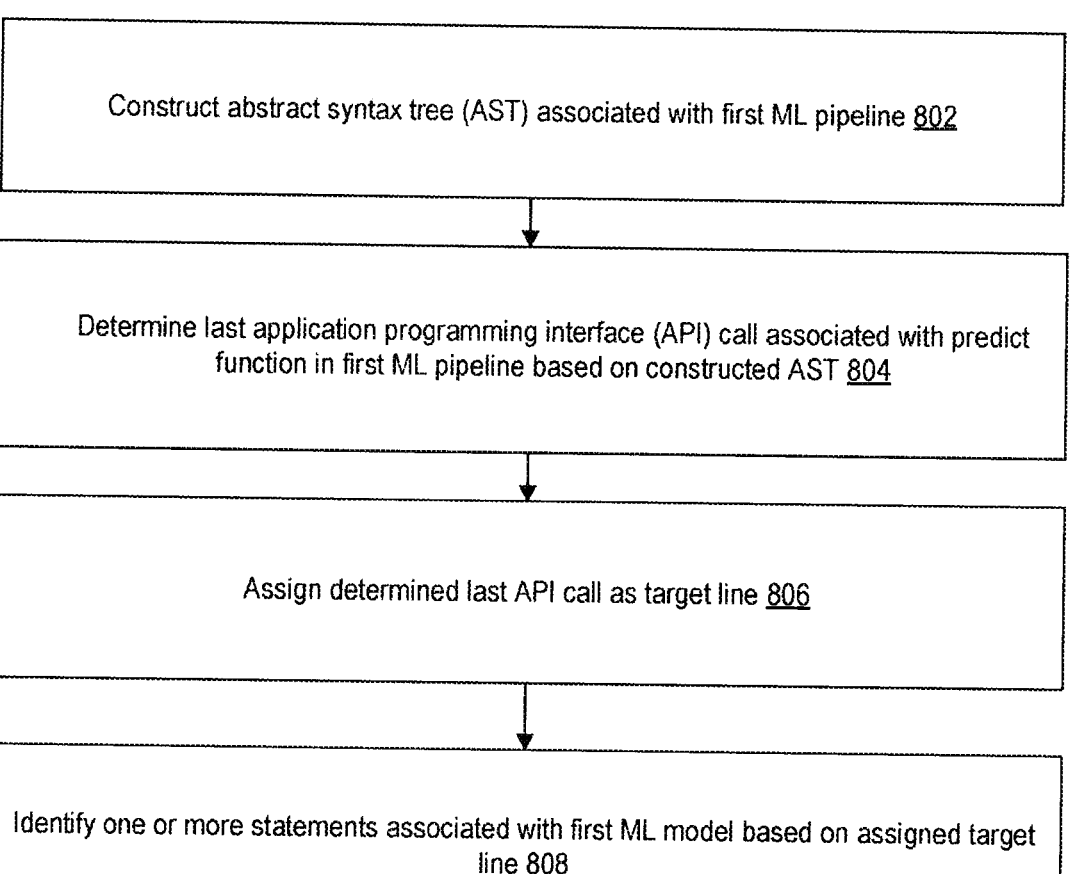
Construct abstract syntax tree (AST) associated with first ML pipeline 802
Determine last application programming interface (API) call associated with predict function in first ML pipeline based on constructed AST 804
Assign determined last API call as target line 806
Identify one or more statements associated with first ML model based on assigned target line 808
*FIG. 8*

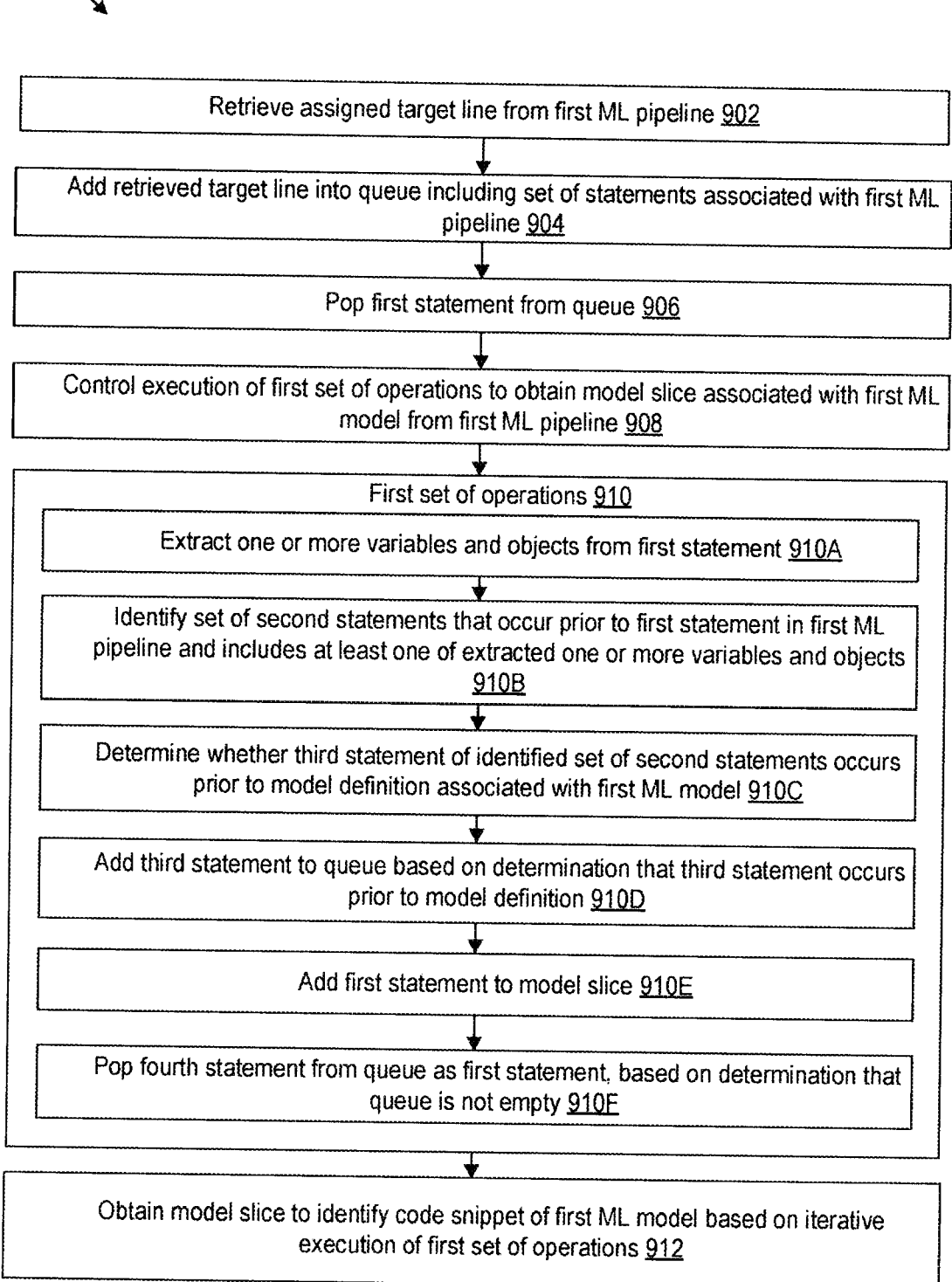

900

Retrieve assigned target line from first ML pipeline 902

Add retrieved target line into queue including set of statements associated with first ML pipeline 904

Pop first statement from queue 906

Control execution of first set of operations to obtain model slice associated with first ML model from first ML pipeline 908

First set of operations 910

Extract one or more variables and objects from first statement 910A

Identify set of second statements that occur prior to first statement in first ML pipeline and includes at least one of extracted one or more variables and objects 910B Determine whether third statement of identified set of second statements occurs prior to model definition associated with first ML model 910C Add third statement to queue based on determination that third statement occurs prior to model definition 910D Add first statement to model slice 910E Pop fourth statement from queue as first statement, based on determination that queue is not empty 910F Obtain model slice to identify code snippet of first ML model based on iterative execution of first set of operations 912

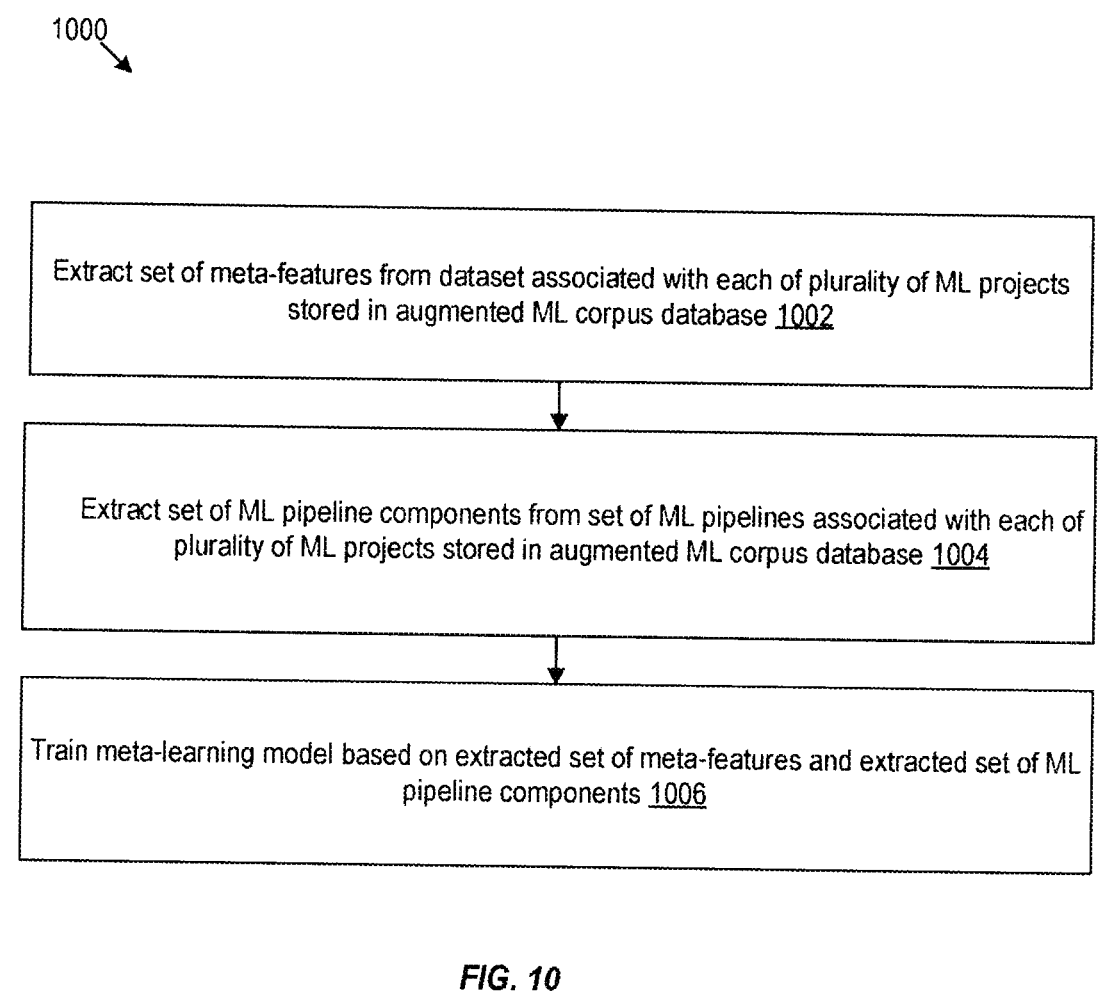

Extract set of meta-features from dataset associated with each of plurality of ML projects stored in augmented ML corpus database 1002

Extract set of ML pipeline components from set of ML pipelines associated with each of plurality of ML projects stored in augmented ML corpus database 1004

Train meta-learning model based on extracted set of meta-features and extracted set of ML pipeline components 1006

*FIG. 10*

AUGMENTATION OF MACHINE LEARNING PIPELINE CORPUS FOR SYNTHESIZING NEW MACHINE LEARNING PIPELINES

CROSS-REFERENCE TO RELATED APPLICATIONS/INCORPORATION BY REFERENCE

This application claims priority to U.S. Provisional Patent Application Ser. No. 63/260,908 filed on Sep. 3, 2021, titled, "Using Data Augmentation With Learning From Human-Written Pipelines To Generate High-Quality ML Pipelines", the entire content of which is hereby incorporated herein by reference.

FIELD

The embodiments discussed in the present disclosure are related to augmentation of machine learning pipeline corpus for synthesis of new machine learning pipelines.

BACKGROUND

Advancements in the field of artificial intelligence (AI) and machine learning (ML) have led to application of AI/ML algorithms in a variety of domains. Typically, ML pipelines may be created manually by data scientists for a given dataset. The manual creation of ML pipelines may be a time-consuming task, which may require a significant amount of effort of expert users, such as, the data scientists. Recently, certain techniques for automatic generation of ML pipelines for datasets have been developed. Current techniques for automatic generation of ML pipelines typically follow an exploratory approach, where a vast space of possible ML pipelines may be iteratively searched to find an optimal pipeline for a given dataset, based on an instantiation and test of multiple candidate ML pipelines. Thus, the current techniques for the automatic generation of ML pipelines may not be able to generate accurate ML pipelines and may require a significant computation time and resources.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

According to an aspect of an embodiment, operations may include receiving a machine learning (ML) project from a plurality of ML projects stored in an ML corpus database. Herein, each of the plurality of ML projects may include a dataset and a set of ML pipelines applicable on the dataset. The operations may further include mutating a first ML pipeline, of a set of first ML pipelines associated with the received ML project, to determine a set of second ML pipelines, based on a set of predefined ML pipelines. Herein, the mutation of the first ML pipeline may correspond to a substitution of a first ML model associated with the first ML pipeline with a second ML model associated with one of the sets of predefined ML pipelines. The operations may further include selecting one or more ML pipelines from the determined set of second ML pipelines based on a performance score associated with each of the determined set of second ML pipelines. The operations may further include augmenting the ML corpus database to include the selected one or more ML pipelines and the set of first ML pipelines associated with the received ML project.

The objects and advantages of the embodiments will be realized and achieved at least by the elements, features, and combinations particularly pointed out in the claims.

Both the foregoing general description and the following detailed description are given as examples and are explanatory and are not restrictive of the invention, as claimed.

BRIEF DESCRIPTION OF THE DRAWINGS

Example embodiments will be described and explained with additional specificity and detail through the use of the accompanying drawings in which:

FIG. 3 is a diagram that illustrates a flowchart of an example method for augmentation of a machine learning pipeline corpus for synthesis of new machine learning pipelines;

FIG. 4 is a diagram that illustrates a flowchart of an example method for mutation of a first ML pipeline, of a set of ML pipelines associated with a received ML project, to determine a set of second ML pipelines;

FIG. 7 is a diagram that illustrates a flowchart of an example method for instantiation of the selected second ML model from a set of predefined models associated with a set of predefined ML pipelines;

FIG. 8 is a diagram that illustrates flowchart of an example method for identification of one or more statements associated with a first ML model;

FIG. 9 is a diagram that illustrates a flowchart of an example method to obtain a model slice to identify a code snippet of a first ML model;

FIG. 10 is a diagram that illustrates a flowchart of an example method for training of a meta-learning model.

DESCRIPTION OF EMBODIMENTS

Figure 1:
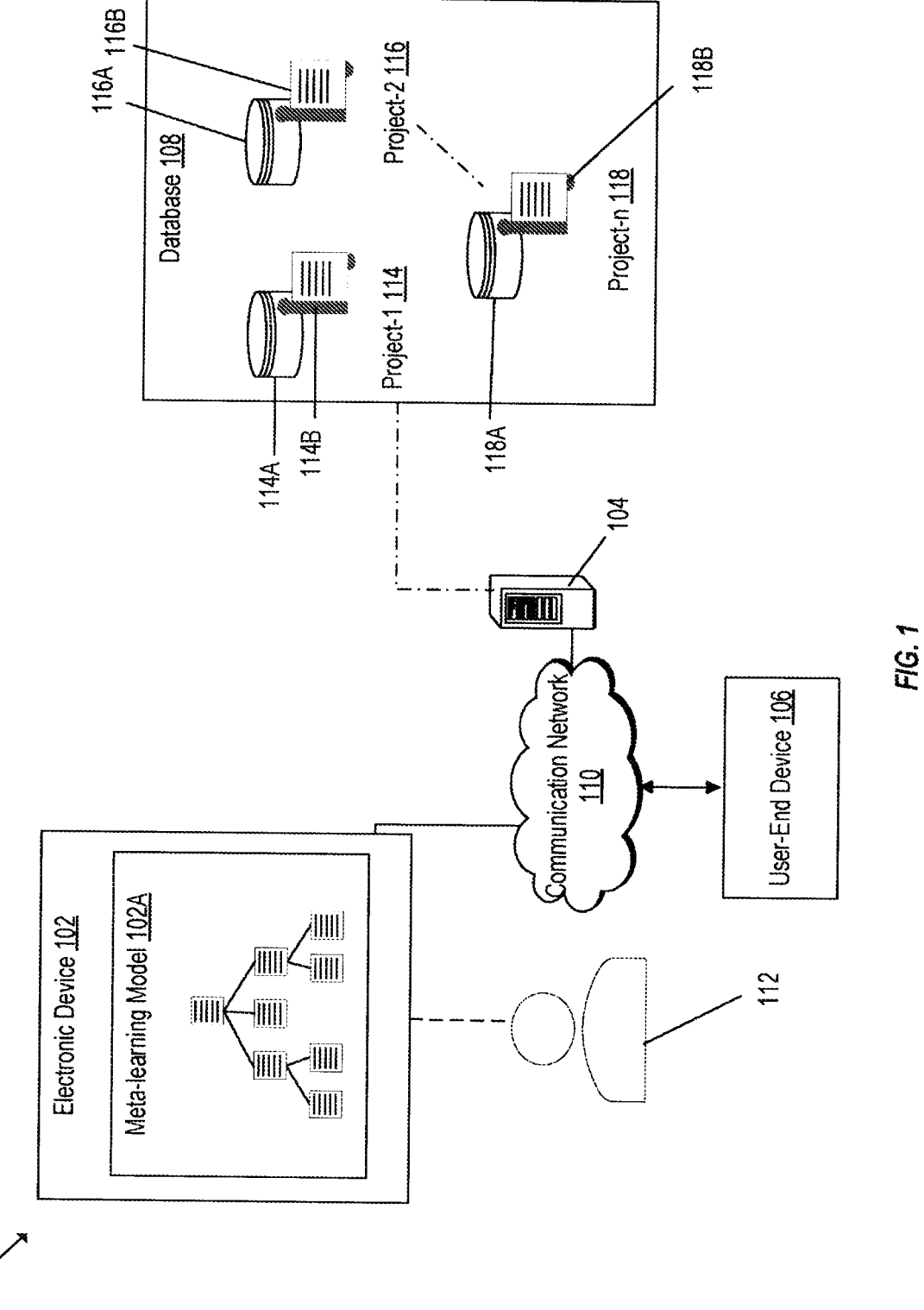
FIG. 1 is a diagram representing an example environment related to augmentation of a machine learning pipeline corpus.

Some embodiments described in the present disclosure relate to methods and systems for augmentation of a machine learning pipeline corpus for synthesis of new machine learning pipelines. In the present disclosure, a machine learning (ML) project may be received from a plurality of ML projects stored in an ML corpus database. Further, a first ML pipeline, of a set of first ML pipelines associated with the received ML project, may be mutated to determine a set of second ML pipelines, based on a set of predefined ML pipelines. Herein, the mutation of the first ML pipeline may correspond to a substitution of a first ML model associated with the first ML pipeline with a second ML model associated with one of the set of predefined ML pipelines. Thereafter, one or more ML pipelines may be selected from the determined set of second ML pipelines based on a performance score associated with each of the determined set of second ML pipelines. Further, the ML corpus database may be augmented to include the selected one or more ML pipelines and the set of first ML pipelines associated with the received ML project.

According to one or more embodiments of the present disclosure, the technological field of artificial intelligence (AI)/machine learning (ML) may be improved by configuring a computing system in a manner that the computing system may be able to augment an ML pipeline corpus for synthesis of new ML pipelines. The computing system may receive an ML project from a plurality of ML projects stored in an ML corpus database. Herein, each of the plurality of ML projects may include a dataset and a set of ML pipelines applicable on the dataset. The computing system may mutate a first ML pipeline, of a first set of ML pipelines associated with the received ML project, to determine a set of second ML pipelines, based on a set of predefined ML pipelines. Herein, the mutation of the first ML pipeline may correspond to a substitution of a first ML model associated with the first ML pipeline with a second ML model associated with one of the set of predefined ML pipelines. Further, the set of first ML pipelines may correspond to each ML pipeline associated with the received ML project. The first ML pipeline may be selected from the set of first ML pipelines. Thereafter, the computing system may select one or more ML pipelines from the determined set of second ML pipelines based on a performance score associated with each of the determined set of second ML pipelines. Further, the computing system may augment the ML corpus database to include the selected one or more ML pipelines and the set of first ML pipelines associated with the received ML project.

Traditional methods used to generate ML pipelines may require explicit search of a large space of possible ML pipelines to determine an optimal ML pipeline for an ML project. Thus, the traditional techniques for automatic generation of ML pipelines may not be able to generate accurate ML pipelines and may require a significant computational time and resources. On the other hand, the disclosed technique (performed by the computing system) may include mutating the first ML pipeline, of the set of first ML pipelines associated with the received ML project, to determine the set of second ML pipelines. Herein, the mutation of the first ML pipeline may correspond to the substitution of the first ML model associated with the first ML pipeline with the second ML model associated with one of the set of predefined ML pipelines. Further, the disclosed technique may include selecting one or more ML pipelines from the determined set of second ML pipelines based on the performance score associated with each of the determined set of second ML pipelines. The ML corpus database may be augmented to include the selected one or more ML pipelines and the set of first ML pipelines. Thus, the disclosed technique may choose such mutated ML pipeline(s) that may have a high-performance score, thereby ensuring a good accuracy of a final set of ML pipelines in the augmented ML corpus database.

An electronic device of the present disclosure may follow a generative approach, whereby a meta-learning model may learn from corpora of existing ML pipelines created by data scientists for other datasets and use it to efficiently and optimally synthesize ML pipeline for new datasets. The present disclosure may substantially resolve a key challenge of generative learning-based auto machine learning approaches. The electronic device of the present disclosure may augment the ML corpus database using a data augmentation technique that may systematically mutate the given ML pipelines by replacing an ML model used in the existing ML pipelines of the corpora with other viable choices to create a new population of ML pipelines. The new population of ML pipelines may be used to provide higher-quality and more consistent learning features to the meta-learning model so that the meta-learning model may learn from the augmented ML corpus database and may subsequently synthesize new higher-quality ML pipelines for user datasets. The mutation may employ a novel abstract syntax tree (AST) level analysis of the human-written pipeline for extracting requisite program elements and mutating them in a syntactically well-formed manner, accounting for all syntactic and stylistic variations human-written programs, such as ML pipelines may typically contain. Thus, new ML pipelines may be efficiently synthesized.

Embodiments of the present disclosure are explained with reference to the accompanying drawings.

FIG. 1 is a diagram representing an example environment related to augmentation of a machine learning pipeline corpus, according to at least one embodiment described in the present disclosure. With reference to FIG. 1, there is shown an environment 100. The environment 100 may include an electronic device 102, a server 104, a user-end device 106, a database 108, and a communication network 110. The electronic device 102, the server 104, and the user-end device 106 may be communicatively coupled to one another, via the communication network 110. The electronic device 102 may comprise a meta-learning model 102A. In FIG. 1, there is further shown a user 112, who may be associated with or operate the electronic device 102 (or the user-end device 106). The database 108 may include a plurality of ML projects. For example, the plurality of the ML project may include 'n' number of ML projects such as, an ML project-1 114, an ML project-2 116, . . . and an ML project-n 118. Each of the plurality of ML projects may include a dataset and a set of ML pipelines applicable on the dataset. For example, the ML project-1 114 may include a dataset 114A and a set of ML pipelines 114B. Further, the ML project-2 116 may include a dataset 116A and a set of ML pipelines 116B. Similarly, the ML project-n 118 may include a dataset 118A and a set of ML pipelines 118B.

The "n" number of ML projects shown in FIG. 1 is presented merely as an example. The plurality of the ML project may include only two ML projects or more than "n" ML project, without deviation from the scope of the disclosure. For the sake of brevity, only "n" ML projects have been shown in FIG. 1. However, in some embodiments, there may be more than "n" ML projects, without limiting the scope of the disclosure.

The electronic device 102 may include suitable logic, circuitry, and interfaces that may be configured to receive a receive a machine learning (ML) project (e.g., the ML project-1 114) from the plurality of ML projects stored in an ML corpus database (such as, the database 108). The electronic device 102 may be further configured to mutate a first ML pipeline, of a set of first ML pipelines associated with the received ML project, to determine a set of second ML pipelines, based on a set of predefined ML pipelines. The electronic device 102 may be further configured to select one or more ML pipelines from the determined set of second ML pipelines based on a performance score associated with each of the determined set of second ML pipelines. The electronic device 102 may be further configured to augment the ML corpus database to include the selected one or more ML pipelines and the set of first ML pipelines associated with the received ML project. Examples of the electronic device 102 may include, but are not limited to, a computing device, a smartphone, a cellular phone, a mobile phone, a gaming device, a mainframe machine, a server, a computer workstation, and/or a consumer electronic (CE) device.

The meta-learning model 102A may include suitable logic, circuitry, interfaces, and/or code that may be configured to use meta-learning algorithms to generate a predictive model based on previously trained models (e.g., ML pipelines) and data-frames or features. The meta-learning model 102A may learn from the output of the other learning algorithms. For example, for prediction, the meta-learning model 102A may learn based on the output of the other learning algorithms. In another example, the meta-learning model 102A may be fed with parameters of other ML models (e.g., a neural network model, a polynomial regression model, a random forest classifier, a logistic regression model, or an ensemble learning model) and data-frames/features corresponding to each ML algorithm. The meta-learning model 102A may learn meta-features and meta-heuristics based on the data-frames/features and parameters associated with each of the input ML models. In an example, once the meta-learning model 102A is trained, the meta-learning model 102A may be used to generate ML pipelines based on input features or data-frames associated with an ML project.

The server 104 may include suitable logic, circuitry, and interfaces, and/or code that may be configured to receive the machine learning (ML) project from the plurality of ML projects stored in the ML corpus database (e.g., the database 108). The server 104 may be further configured to mutate the first ML pipeline, of the set of first ML pipelines associated with the received ML project, to determine the set of second ML pipelines. The server 104 may be further configured to select the one or more ML pipelines from the determined set of second ML pipelines based on the performance score associated with each of the determined set of second ML pipelines. The server 104 may be further configured to augment the ML corpus database to include the selected one or more ML pipelines and the set of first ML pipelines associated with the received ML project. The server 104 may be implemented as a cloud server and may execute operations through web applications, cloud applications, HTTP requests, repository operations, file transfer, and the like. Other example implementations of the server 104 may include, but are not limited to, a database server, a file server, a web server, a media server, an application server, a mainframe server, or a cloud computing server.

In at least one embodiment, the server 104 may be implemented as a plurality of distributed cloud-based resources by use of several technologies that are well known to those ordinarily skilled in the art. A person with ordinary skill in the art will understand that the scope of the disclosure may not be limited to the implementation of the server 104 and the electronic device 102 as two separate entities. In certain embodiments, the functionalities of the server 104 can be incorporated in its entirety or at least partially in the electronic device 102, without a departure from the scope of the disclosure. In certain embodiments, the server 104 may host the database 108. Alternatively, the server 104 may be separate from the database 108 and may be communicatively coupled to the database 108.

The user-end device 106 may comprise suitable logic, circuitry, interfaces, and/or code that may be configured to store a real-time application where new ML pipelines may be synthesized based on the augmentation of the ML corpus. In some embodiments, the user-end device 106 may receive a first user-input from a user (e.g., a data-scientist, such as, the user 112) and generate the set of pre-defined ML pipelines based on the received first user-input. In another embodiment, the user-end device 106 may receive one or more second user-inputs from a user (e.g., a data-scientist, such as, the user 112) and generate the set of ML pipelines associated with each of the plurality of ML projects based on the one or more second user-inputs. In addition, the user-end device 106 may receive a plurality of datasets associated with the plurality of projects from various sources such as, online dataset repositories, code repositories, and online open-source projects. The user-end device 106 may be configured to upload the set of pre-defined ML pipelines, and the plurality of ML pipelines, and the plurality of datasets associated with the plurality of projects to the server 104. The uploaded plurality of ML pipelines and the plurality of datasets may be stored in an ML corpus database in the database 108 as the plurality of ML projects. The uploaded set of pre-defined ML pipelines may also be stored in the database 108 along with the plurality of ML projects. Examples of the user-end device 106 may include, but are not limited to, a mobile device, a desktop computer, a laptop, a computer workstation, a computing device, a mainframe machine, a server, such as a cloud server, and a group of servers.

The database 108 may include suitable logic, interfaces, and/or code that may be configured to store the plurality of ML projects, wherein each ML project may include a dataset and a set of ML pipelines applicable on the dataset. The database 108 may further store the set of pre-defined ML pipelines. The database 108 may be derived from data off a relational or non-relational database, or a set of comma-separated values (csv) files in conventional or big-data storage. The database 108 may be stored or cached on a device, such as a server (e.g., the server 104) or the electronic device 102. The device storing the database 108 may be configured to receive a query for a machine learning (ML) project from the plurality of ML projects from the electronic device 102. In response, the device of the database 108 may be configured to retrieve and provide the queried machine learning ML project, including the dataset and the set of ML pipelines applicable on the dataset for the queried ML project to the electronic device 102 based on the received query.

In some embodiments, the database 108 may be hosted on a plurality of servers stored at same or different locations. The operations of the database 108 may be executed using hardware including a processor, a microprocessor (e.g., to perform or control performance of one or more operations), a field-programmable gate array (FPGA), or an application-specific integrated circuit (ASIC). In some other instances, the database 108 may be implemented using software.

The communication network 110 may include a communication medium through which the electronic device 102, the server 104, and the user-end device 106 may communicate with one another. The communication network 110 may be one of a wired connection or a wireless connection. Examples of the communication network 110 may include, but are not limited to, the Internet, a cloud network, Cellular or Wireless Mobile Network (such as Long-Term Evolution and 5G New Radio), a Wireless Fidelity (Wi-Fi) network, a Personal Area Network (PAN), a Local Area Network (LAN), or a Metropolitan Area Network (MAN). Various devices in the environment 100 may be configured to connect to the communication network 110 in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, and Bluetooth (BT) communication protocols.

In operation, the electronic device 102 may receive an ML project (e.g., the ML project-1 114) from the plurality of ML projects stored in the ML corpus database (such as, the database 108). Herein, each of the plurality of ML projects may include a dataset and a set of ML pipelines applicable on the dataset. The ML project may help applications to perform tasks such as a prediction task (e.g., classification or regression) without being programmed to do so. The dataset may include historical data corresponding to a specific ML task defined on that dataset. The ML pipeline or a script or a program may be a sequence of operations to train a ML model for a specific ML prediction task. It may be appreciated that data scientists or developers may generate several ML pipelines and datasets and upload such ML pipelines and datasets on the Internet on various online source code and ML repositories as a knowledge base. The knowledge base may be downloaded from the Internet and may be stored in the database 108. The electronic device 102 may receive the ML project from the plurality of ML projects from the database 108. For example, the electronic device 102 may receive the ML project-1 114. Herein, the electronic device 102 may receive the dataset 114A, and the set of ML pipelines 114B corresponding to the ML project-1 114. Details of the plurality of ML projects are further provided, for example, in FIG. 5.

It may be noted that human-written ML pipelines, which may constitute a training corpus of learning-based machine learning approaches may not contain best representative ML pipeline solutions for each dataset. Even worse, the pipelines may be of varied quality and hence, may lack any learnable patterns in terms of what component may be used for what kind of dataset. This issue may be particularly acute in the case of ML models used in the ML pipeline as a choice of the ML model and may significantly impact the accuracy of the ML pipeline. Human-written ML pipelines may be instantiated in many ways such as, under cross validation, hyper-parameter optimization, and so on. Safe refactoring of the human-written ML pipelines that is syntactically and semantically correct may be critical and challenging. Hence, the human-written ML pipelines may need to be mutated.

The electronic device 102 may mutate a first ML pipeline, of the set of ML pipelines associated with the received ML project, to determine a set of second ML pipelines, based on a set of predefined ML pipelines. Herein, the mutation of the first ML pipeline may correspond to a substitution of a first ML model associated with the first ML pipeline with a second ML model associated with one of the set of predefined ML pipelines. It may be noted that the mutation may systematically change the ML model of an original ML pipeline to improve the accuracy of that ML pipeline. As discussed, the first ML pipeline may be human written and may not be optimal due to various reasons. In an example, the data scientist who wrote the set of ML pipelines associated with the received ML project may not be expert due to which an optimal ML model may not be used. In another example, the set of ML pipelines associated with the received ML project may not be optimal because of the unavailability of an optimal model for the dataset. Thus, the set of ML pipelines applicable on the dataset corresponding to the received ML project may need to be mutated to improve its accuracy. The human-written ML pipelines may be syntactically and semantically diverse. So, there may not be a common pattern to replace the original ML pipeline by another ML pipeline. The electronic device 102 of the present disclosure may mutate the first ML pipeline associated with the received ML project to determine the set of second ML pipelines based on the set of predefined ML pipelines. In an embodiment, the first ML pipeline may be mutated to determine a second ML pipeline. In an alternative embodiment, the first ML pipeline may be mutated to determine the set of second ML pipeline. In an embodiment, the electronic device 102 may mutate each ML pipeline or a selected group of ML pipelines of the set of ML pipelines associated with the received ML project. Details of the mutation of the first ML pipeline are further provided, for example, in FIG. 3.

The electronic device 102 may select one or more ML pipelines from the determined set of second ML pipelines based on a performance score associated with each of the determined set of second ML pipelines. Each of the set of second ML pipelines may be ranked based on the performance score associated with each of the determined set of second ML pipelines. The performance score may be an F1-score, an R2-score, and the like, associated with the corresponding ML pipeline of the set of second ML pipelines. For a given dataset and original ML pipeline, the electronic device 102 may execute each mutated ML pipeline on a training dataset in a manner similar to the execution of an ML pipeline on a dataset by a data scientist. Since, an objective of the present disclosure may be to augment the machine learning pipeline corpus with robust ML pipelines, only the best mutated ML pipelines may be retained for meta-learning model training along with the existing ML pipelines. The selected one or more ML pipelines from the determined set of second ML pipelines may be the best ML pipelines, which may be retained for the meta-learning model training. Details of the selection of the one or more ML pipelines are further provided, for example, in FIG. 3.

The electronic device 102 may augment the ML corpus database in the database 108 to include the selected one or more ML pipelines and the set of first ML pipelines associated with the received ML project (e.g., the ML project-1 114). The augmentation may be a standard technique to improve the quality of the ML corpus database. Systematic data augmentation may be used to improve the ML corpus database. Once the one or more ML pipelines may be selected, the electronic device 102 may add the selected one or more ML pipelines to the database 108 in order to improve the quality of the database 108. In an embodiment, the electronic device 102 may add the selected one or more ML pipelines along with the set of first ML pipelines to the database 108. In another embodiment, the electronic device 102 may replace the set of first ML pipelines with the selected one or more ML pipelines in the database 108. Details of the augmentation of the ML corpus database are further provided, for example, in FIG. 5.

The electronic device 102 may help to improve a training of the meta-learning model 102A based on the augmentation of the ML corpus database using good quality ML pipelines, which may perform well on the given dataset. The meta-learning model 102A may generate an abstract version of an ML pipeline. Thus, if the accuracy of the meta-learning model 102A is below a specific quality threshold, then the generated ML pipeline may not be optimal. On the other hand, if the quality of the meta-learning model 102A is good or above the specific quality threshold, then the generated ML pipeline may be better. Hence, if training of the meta-learning model 102A is based solely on the original ML pipelines that may be directly obtained from the Internet, then the quality of the meta-learning model 102A may not be acceptable, in spite of precautions taken during download of the original ML pipelines.

Modifications, additions, or omissions may be made to FIG. 1 without departing from the scope of the present disclosure. For example, the environment 100 may include more or fewer elements than those illustrated and described in the present disclosure. For instance, in some embodiments, the environment 100 may include the electronic device 102 but not the database 108. In addition, in some embodiments, the functionality of each of the database 108 and the server 104 may be incorporated into the electronic device 102, without a deviation from the scope of the disclosure.

Figure 2:
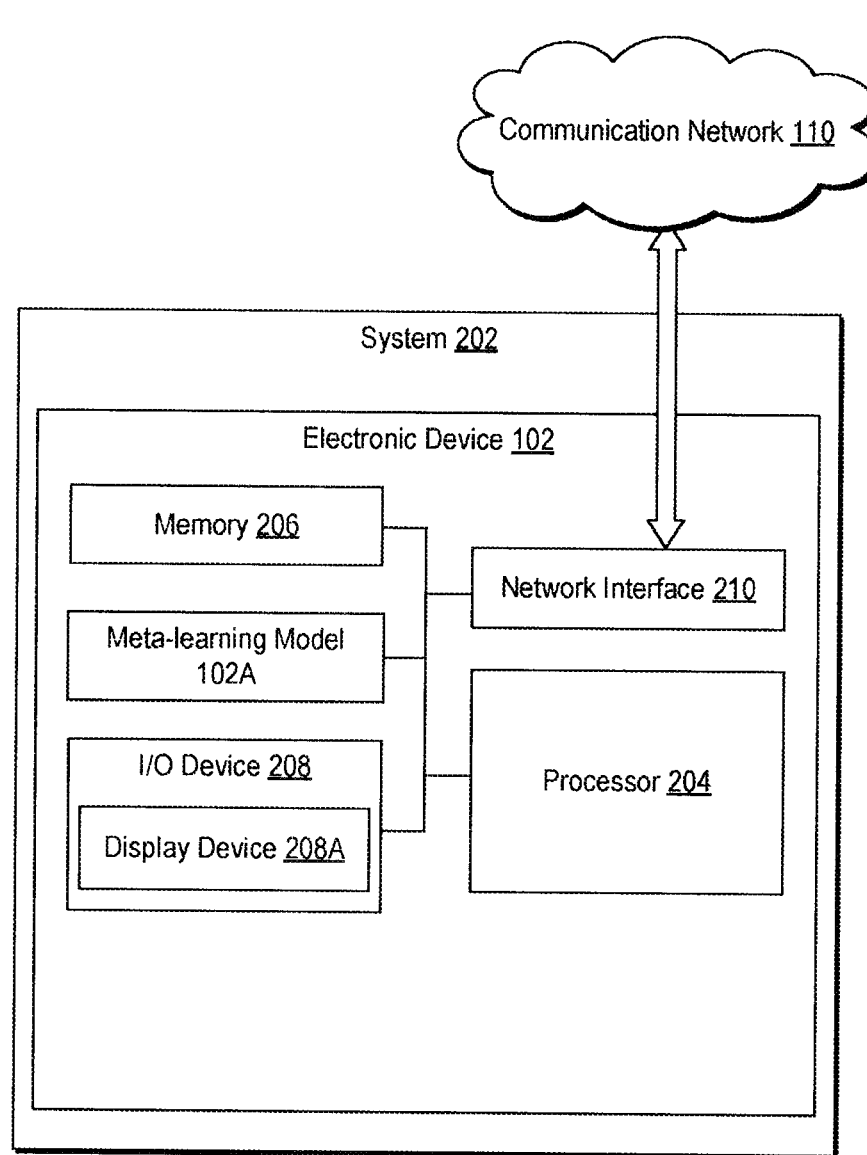
FIG. 2 is a block diagram of a system for augmentation of the machine learning pipeline corpus.

FIG. 2 is a block diagram of a system for augmentation of the machine learning pipeline corpus, in accordance with at least one embodiment described in the present disclosure. FIG. 2 is explained in conjunction with elements from FIG. 1. With reference to FIG. 2, there is shown a block diagram 200 of a system 202 including the electronic device 102. The electronic device 102 may include a processor 204, a memory 206, the meta-learning model 102A, an input/output (I/O) device 208 (including the display device 208A), and a network interface 210.

The processor 204 may include suitable logic, circuitry, and interfaces that may be configured to execute a set of instructions stored in the memory 206. The processor 204 may be configured to execute program instructions associated with different operations to be executed by the electronic device 102. For example, some of the operations may include receiving the machine learning (ML) project, mutating the first ML pipeline, selecting the one or more ML pipelines from the determined set of second ML pipelines, and augmenting the ML corpus database. The processor 204 may be implemented based on a number of processor technologies known in the art. Examples of the processor technologies may include, but are not limited to, a Central Processing Unit (CPU), X86-based processor, a Reduced Instruction Set Computing (RISC) processor, an Application-Specific Integrated Circuit (ASIC) processor, a Complex Instruction Set Computing (CISC) processor, a Graphical Processing Unit (GPU), and other processors.

Although illustrated as a single processor in FIG. 2, the processor 204 may include any number of processors configured to, individually or collectively, perform or direct performance of any number of operations of the electronic device 102, as described in the present disclosure. Additionally, one or more of the processors may be present on one or more different electronic devices, such as different servers. In some embodiments, the processor 204 may be configured to interpret and/or execute program instructions and/or process data stored in the memory 206. After the program instructions are loaded into the memory 206, the processor 204 may execute the program instructions. Some of the examples of the processor 204 may be a Graphics Processing Unit (GPU), a Central Processing Unit (CPU), a Reduced Instruction Set Computer (RISC) processor, an ASIC processor, a Complex Instruction Set Computer (CISC) processor, a co-processor, and/or a combination thereof.

The memory 206 may include suitable logic, circuitry, and interfaces that may be configured to store the one or more instructions to be executed by the processor 204. The one or more instructions stored in the memory 206 may be executed by the processor 204 to perform the different operations of the processor 204 (and the electronic device 102). The memory 206 may be configured to store the plurality of ML projects, the set of pre-defined ML pipelines, the set of first ML pipelines, the set of second ML pipelines, and the selected one or more ML pipelines. Examples of implementation of the memory may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The I/O device 208 may include suitable logic, circuitry, and interfaces that may be configured to receive an input from the user 112 and provide an output based on the received input. For example, the I/O device 208 may receive from the user 112, a user-input associated with the generation of an ML pipeline, a dataset associated with the ML pipeline, or an ML project. Further, the I/O device 208 may render the determined set of second ML pipelines, the selected one or more ML pipelines, and/or a predicted output of the meta-learning model 102A, which may be trained based on the augmented ML corpus database. The I/O device 208 may include various input and output devices, may be configured to communicate with the processor 204. Examples of the I/O device 208 may include, but are not limited to, a touch screen, a keyboard, a mouse, a joystick, a microphone, a display device (such as, the display device 208A), and a speaker The display device 208A may include suitable logic, circuitry, and interfaces that may be configured to display the set of second ML pipelines, and/or the selected one or more ML pipelines. The display device 208A may be a touch screen which may enable a user (e.g., the user 112) to provide a user-input via the display device 208A. The touch screen may be at least one of a resistive touch screen, a capacitive touch screen, or a thermal touch screen. The display device 208A may be realized through several known technologies such as, but not limited to, at least one of a Liquid Crystal Display (LCD) display, a Light Emitting Diode (LED) display, a plasma display, or an Organic LED (OLED) display technology, or other display devices. In accordance with an embodiment, the display device 208A may refer to a display screen of a head mounted device (HMD), a smart-glass device, a see-through display, a projection-based display, an electro-chromic display, or a transparent display.

The network interface 210 may include suitable logic, circuitry, and interfaces that may be configured to facilitate communication between the processor 204, the server 104, the user-end device 106 (or any other device in the environment 100), via the communication network 110. The network interface 210 may be implemented by use of various known technologies to support wired or wireless communication of the electronic device 102 with the communication network 110. The network interface 210 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, or a local buffer circuitry. The network interface 210 may be configured to communicate via wireless communication with networks, such as the Internet, an Intranet or a wireless network, such as a cellular telephone network, a wireless local area network (LAN), and a metropolitan area network (MAN). The wireless communication may be configured to use one or more of a plurality of communication standards, protocols and technologies, such as Global System for Mobile Communications (GSM), Enhanced Data GSM Environment (EDGE), wideband code division multiple access (W-CDMA), Long Term Evolution (LTE), 5th Generation (5R) New Radio (NR), code division multiple access (CDMA), time division multiple access (TDMA), Bluetooth, Wireless Fidelity (Wi-Fi) (such as IEEE 802.11a, IEEE 802.11b, IEEE 802.11g or IEEE 802.11n), voice over Internet Protocol (VoIP), light fidelity (Li-Fi), Worldwide Interoperability for Microwave Access (Wi-MAX), a protocol for email, instant messaging, and a Short Message Service (SMS).

Modifications, additions, or omissions may be made to the example electronic device 102 without departing from the scope of the present disclosure. For example, in some embodiments, the example electronic device 102 may include any number of other components that may not be explicitly illustrated or described for the sake of brevity.

FIG. 3 is a diagram that illustrates a flowchart of an example method for augmentation of a machine learning pipeline corpus for synthesis of new machine learning pipelines, in accordance with an embodiment of the disclosure. FIG. 3 is described in conjunction with elements from FIG. 1 and FIG. 2. With reference to FIG. 3, there is shown a flowchart 300. The method illustrated in the flowchart 300 may start at block 302 and may be performed by any suitable system, apparatus, or device, such as by the example electronic device 102 of FIG. 1 or the 204 of FIG. 2. Although illustrated with discrete blocks, the steps and operations associated with one or more of the blocks of the flowchart 300 may be divided into additional blocks, combined into fewer blocks, or eliminated, depending on the particular implementation.

At block 302, the machine learning (ML) project (e.g., the ML project-1 114) from the plurality of ML projects stored in the ML corpus database (e.g., the database 108) may be received. Herein, each of the plurality of ML projects may include a dataset and a set of ML pipelines applicable on the dataset. The processor 204 may be configured to receive the ML project from the plurality of ML projects stored in the ML corpus database (e.g., the database 108). The ML project may help applications to perform tasks such as a prediction task (e.g., classification or regression) without being programmed to do so. The dataset may include historical data corresponding to a specific ML task defined on that dataset. The ML pipeline may include sequence of operations that may be used for training an ML model for a specific ML task. It may be appreciated that data scientists or developers may generate several ML pipelines and datasets, and upload such ML pipelines and datasets on the Internet on various online source code and ML repositories as a knowledge base. The knowledge base may be downloaded from the Internet and may be stored in the database 108. The electronic device 102 may receive the ML project from the plurality of ML projects from the database 108. For example, the electronic device 102 may receive the ML project-1 114. Herein, the electronic device 102 may receive the dataset 114A and the set of ML pipelines 114B corresponding to the ML project-1 114.

At block 304, the first ML pipeline, of the set of first ML pipelines associated with the received ML project, may be mutated based on the set of pre-defined ML pipelines, to determine the set of second ML pipelines. Herein, the mutation of the first ML pipeline may correspond to the substitution of the first ML model associated with the first ML pipeline with the second ML model associated with one of the set of predefined ML pipelines. Further, the set of first ML pipelines may correspond to each ML pipeline associated with the received ML project. The first ML pipeline may be selected from the set of first ML pipelines. The processor 204 may be configured to mutate the first ML pipeline associated with the received ML project based on one of the set of predefined ML pipelines to determine the set of second ML pipelines. It may be noted that the mutation may systematically change the ML model of an original ML pipeline to improve the accuracy of that ML pipeline. As discussed, the first ML pipeline may be human written and may not be optimal due to various reasons. In an example, the data scientist who may write the set of first ML pipelines associated with the received ML project may not be expert due to which an optimal ML model may not be used. In another example, the set of first ML pipelines associated with the received ML project may not be optimal because of the unavailability of an optimal model for the dataset. Thus, the set of first ML pipelines associated with the received ML project may need to be mutated to improve its accuracy. The human-written ML pipelines may be syntactically and semantically diverse. So, there may not be a common pattern that may be used to replace the original ML pipeline by another ML pipeline. The processor 204 may mutate the first ML pipeline associated with the received ML project to determine the set of second ML pipelines based on the set of predefined ML pipelines. In an embodiment, the first ML pipeline may be mutated to determine one second ML pipeline. In an alternative embodiment, the first ML pipeline may be mutated to determine the set of second ML pipeline comprising multiple second ML pipelines. In an embodiment, the electronic device 102 may mutate each ML pipeline of the set of ML pipelines associated with the received ML project one by one. Details of the mutation of the first ML pipeline are further provided, for example, in FIG. 5.

At block 306, the one or more ML pipelines from the determined set of second ML pipelines may be selected based on the performance score associated with each of the determined set of second ML pipelines. The processor 204 may be configured to select the one or more ML pipelines from the determined set of second ML pipelines based on the performance score associated with each of the determined set of second ML pipelines. Each of the set of second ML pipelines may be ranked based on the performance score associated with each of the determined set of second ML pipelines. For a given dataset and original ML pipeline, the electronic device 102 may automatically execute each mutated ML pipeline on a training dataset in a manner similar to the execution of an ML pipeline on a dataset by a data scientist. Since, an objective of the present disclosure may be to augment the machine learning pipeline corpus with robust ML pipelines, only the best ML mutated pipelines may be retained with the existing ML pipelines. The selected one or more ML pipelines from the determined set of second ML pipelines may be the best ML pipelines, which may be retained for the meta-learning model training.

In an embodiment, the performance score associated with each of the determined set of second ML pipelines may correspond to, but is not limited to, an F1-score or an R2-score associated with the corresponding ML pipeline. In an example, the performance score of an ML pipeline may correspond to a ratio of the F1-score and the R2 score of the ML pipeline. It may be appreciated that the F1-score may determine the accuracy of a given ML model for a given dataset based on a harmonic mean of a precision and a recall of the given ML model. Herein, the precision of the model may be determined based on a ratio of a number of true positive results to a total number of positive results including the true positives and false positives. The recall or a sensitivity of the given ML model may be determined based on a ratio of the number of true positive results to total number of true positives and false negatives. The F1-score may be determined based on an equation (1), as follows:

$$F1 - score = 2 \times \frac{precision \times recall}{precesion + recall} \qquad (1)$$

The F1-score may have a range between "0" to "1". Herein, the F1-score may be close to "1" when the precision and the recall for the given ML model may be close to "1". Similarly, the F1-score may be "0" when either the precision or the recall for the given ML model may be close to "0". In an embodiment, the F1-score associated with each of the determined set of second ML pipelines may be determined to select the one or more ML pipelines. In an example, the determined set of ML pipelines may include five ML pipelines such as, an ML pipeline-1 with an F1-score of "0.2", an ML pipeline-2 with an F1-score of "0.27", an ML pipeline-3 with an F1-score of "0.55", an ML pipeline-4 with an F1-score of "0.65", and an ML pipeline-5 with an F1-score of "0.72". Herein, the ML pipeline-5 may be most accurate ML pipeline amongst the five ML pipelines. Hence, the ML pipeline-5 may be selected as the one or more ML pipelines.

The R2-score, also known as R-squared score, may be a coefficient that may indicate how well a given ML model may be fit for a dataset. The R2-score may depict how variations in independent variables may affect dependent variables of the given ML model. The R2-score may be determined based on a ratio of a sum of squares regression or residuals (SSR) to a total sum of squares total (TSS). Herein, the SSR may be a total variation of predicated values from a mean value of all dependent variables. The TSS may be a total variation of actual values from the mean values. Similar to the F1-score, the R2-score may have values between "0" to "1". When R2-score is "1", changes in the dependent variables may be completely explained by changes in the independent variables. That is, when the value of R2-score is closer to "1", the given ML model may be a better fit for a dataset. In an embodiment, the R2-score associated with each of the determined set of second ML pipelines may be determined to select the one or more ML pipelines. In an example, the determined set of second ML pipelines may include five ML pipelines such as, an ML pipeline-1 with an R2-score of "0.4", an ML pipeline-2 with an R2 score of "0.5", an ML pipeline-3 with an R2-score of "0.75", an ML pipeline-4 with an R2-score of "0.65", and an ML pipeline-5 with an R2-score of "0.6". Herein, as the ML pipeline-3 may have the highest R2-score amongst the five ML pipelines, the ML pipeline-3 may be best fitted amongst the five ML pipelines. Hence, the ML pipeline-3 may be selected as the one or more ML pipelines.

In an embodiment, the one or more ML pipelines selected from the determined set of second ML pipelines may include one of, but may not be limited to, an ML pipeline (from the determined set of second ML pipelines), associated with a maximum performance score, a first group of ML pipelines (from the determined set of second ML pipelines) that may correspond to a performance score above a threshold, or second group of ML pipelines (from the determined set of second ML pipelines) that may correspond to a predefined number of top ML pipelines based on the performance score.

For example, the selected one or more ML pipelines may include the ML pipeline (from the determined set of second ML pipelines), associated with the maximum performance score (e.g., the F1-score or the R2-score). Herein, the ML pipeline with the maximum performance score amongst the determined set of second ML pipelines may selected as the one or more ML pipelines. In an example, the determined set of ML pipelines may include seven ML pipelines such as, an ML pipeline-1 with an R2-score of "0.4", an ML pipeline-2 with an R2-score of "0.5", an ML pipeline-3 with an R2-score of "0.75", an ML pipeline-4 with an R2-score of "0.65", an ML pipeline-5 with an R2-score of "0.6", an ML pipeline-6 with an R2-score of "0.8", and an ML pipeline-7 with an R2-score of "0.49". Herein, the ML pipeline-6 has the highest R2-score of 0.8. Hence, the ML pipeline-6 may be selected as the one or more ML pipelines.

In another example, the selected one or more ML pipelines may include the first group of ML pipelines (from the determined set of second ML pipelines) that may correspond to a performance score above the threshold. Herein, the threshold may be a value of the performance score (e.g., the F1-score or the R2-score), which may be used to select the one or more ML pipelines. Consider the previous scenario of the determined set of second ML pipelines including the seven ML pipelines and the threshold value as "0.7". Herein, the ML pipeline-3 (with the R2-score of "0.75") and the ML pipeline-4 (with the R2-score of "0.8") may be selected as the one or more ML pipelines, which may have performance scores (e.g., R2-scores) greater than the threshold (e.g., "0.7").

In another example, the selected one or more ML pipelines may include the second group of ML pipelines (from the determined set of second ML pipelines) that may correspond to the predefined number of top ML pipelines based on the performance score. The processor 204 may select top-K (e.g., top 3) ML pipelines based on the performance of each of the determined set of second ML pipelines. Consider the previous scenario of the determined set of second ML pipelines including the seven ML pipelines and the predefined number value (i.e., K) as three. In such case, the top three ML pipelines (based on the respective performance scores) may be selected as the one or more ML pipelines. For example, the selected one or more ML pipelines may include the ML pipeline-2 with the R2-score of "0.69", the ML pipeline-3 with the R2-score of "0.75", and the ML pipeline-4 with the R2-score of "0.8".

At block 308, the ML corpus database (e.g., the database 108) may be augmented to include the selected one or more ML pipelines and the set of first ML pipelines associated with the received ML project. The processor 204 may be configured to augment the ML corpus database (i.e., the database 108) to include the selected one or more ML pipelines and the set of first ML pipelines associated with the received ML project. Once the one or more ML pipelines are selected, the electronic device 102 may add the selected one or more ML pipelines to the database 108 in order to improve the quality of the ML corpus database stored in the database 108. In an embodiment, the electronic device 102 may store the selected one or more ML pipelines along with the set of first ML pipelines to the database 108. In another embodiment, the electronic device 102 may replace the set of first ML pipelines with the selected one or more ML pipelines in the database 108. Control may pass to end.

Although the flowchart 300 is illustrated as discrete operations, such as 302, 304, 306, and 308. However, in certain embodiments, such discrete operations may be further divided into additional operations, combined into fewer operations, or eliminated, depending on the particular implementation without detracting from the essence of the disclosed embodiments.

FIG. 4 is a diagram that illustrates a flowchart of an example method for mutation of a first ML pipeline, of a set of ML pipelines associated with a received ML project, to determine a set of second ML pipelines, in accordance with an embodiment of the disclosure. FIG. 4 is described in conjunction with elements from FIG. 1, FIG. 2, and FIG. 3. With reference to FIG. 4, there is shown a flowchart 400. The method illustrated in the flowchart 400 may start at 402 and may be performed by any suitable system, apparatus, or device, such as by the example electronic device 102 of FIG. 1 or the 204 of FIG. 2. Although illustrated with discrete blocks, the steps and operations associated with one or more of the blocks of the flowchart 400 may be divided into additional blocks, combined into fewer blocks, or eliminated, depending on the particular implementation.

At block 402, a code snippet of the first ML model associated with the first ML pipeline may be identified. Herein, the code snippet may be a portion of code of the first ML pipeline that may implement the first ML model. The processor 204 may be configured to identify the code snippet of the first ML model associated with the first ML pipeline. Since only a portion of code of the first ML pipeline may implement the first ML model, the particular portion may be identified and may be mutated in order to obtain the second ML model. Details of identification of the code snippet of the first ML model are further provided, for example, in FIG. 9.

At block 404, one or more input parameters associated with the identified code snippet may be determined. The processor 204 may be configured to determine one or more input parameters associated with the identified code snippet. In order to keep a functionality of the second ML model same as the first ML model, the one or more input parameters corresponding to the identified code snippet of the first ML model may be fed to the second ML model. Hence, the one or more input parameters of the identified code snippet may be determined and later fed to the second ML model to obtain an equivalent output from the second ML model, that may be determined based to the mutation of the first ML model. Details of the identification of the one or more input parameters associated with the identified code snippet are further provided, for example, in FIG. 6A.

In an embodiment, the determined one or more input parameters associated with the identified code snippet may comprise at least one of: a training dataset, a test dataset, and a set of hyper-parameters associated with the first ML model. Herein, the training dataset may be used to train the first ML model based on an update of weights associated with the first ML model. The test dataset may be used to test the trained first ML model to check whether an accuracy of the trained first ML model is within allowable limits. The set of hyper-parameters may correspond to a set of parameters that may control a learning of the first ML model. For example, a learning rate, a number of neural network layers, a number of neurons in each neural network layer, and the like, may correspond to the set of hyper-parameters. The processor 204 may collect all read access in the one or more input parameters in each application programming interface (API) in the identified code snippet.

At block 406, the second ML model may be selected from a set of predefined models associated with the set of predefined ML pipelines. The processor 204 may be configured to select the second ML model from the set of predefined models associated with the set of predefined ML pipelines. The set of predefined models may be ML models that may be already created. For example, the set of pre-defined models may correspond to human-written ML models that may be created as template ML models for certain application scenarios and datasets. The set of pre-defined models may be stored in the database 108. The processor 204 may receive the set of predefined models associated with the set of predefined ML pipelines from the database 108. Alternatively, the set of pre-defined models may be pre-stored in the memory 206 and the processor 204 may retrieve the set of pre-defined models from the memory 206. Once the set of pre-defined models may be received/retrieved, the processor 204 may select the second ML model from the set of pre-defined models. Details of the selection of the second ML model are further provided, for example, in FIG. 5.

At block 408, the selected second ML model may be instantiated based on the substitution of the first ML model with the selected second ML model in the first ML pipeline. The processor 204 may be configured to instantiate the selected second ML model based on the substitution of the first ML model with the selected second ML model in the first ML pipeline. Herein, the identified code snippet may be replaced with the selected second ML model. The one or more input parameters associated with the identified code snippet may be provided to the selected second ML model. As only the identified code snippet corresponding to the first ML model in the first ML pipeline may be replaced with the selected second ML model and the one or more input parameters may be the same, the functionality of the instantiated second ML model may remain same as the first ML model. Details of the instantiation of the second ML model are further provided, for example, in FIG. 7. Control may pass to end.

Although the flowchart 400 is illustrated as discrete operations, such as 402, 404, 406, and 408. However, in certain embodiments, such discrete operations may be further divided into additional operations, combined into fewer operations, or eliminated, depending on the particular implementation without detracting from the essence of the disclosed embodiments.

Figure 5:
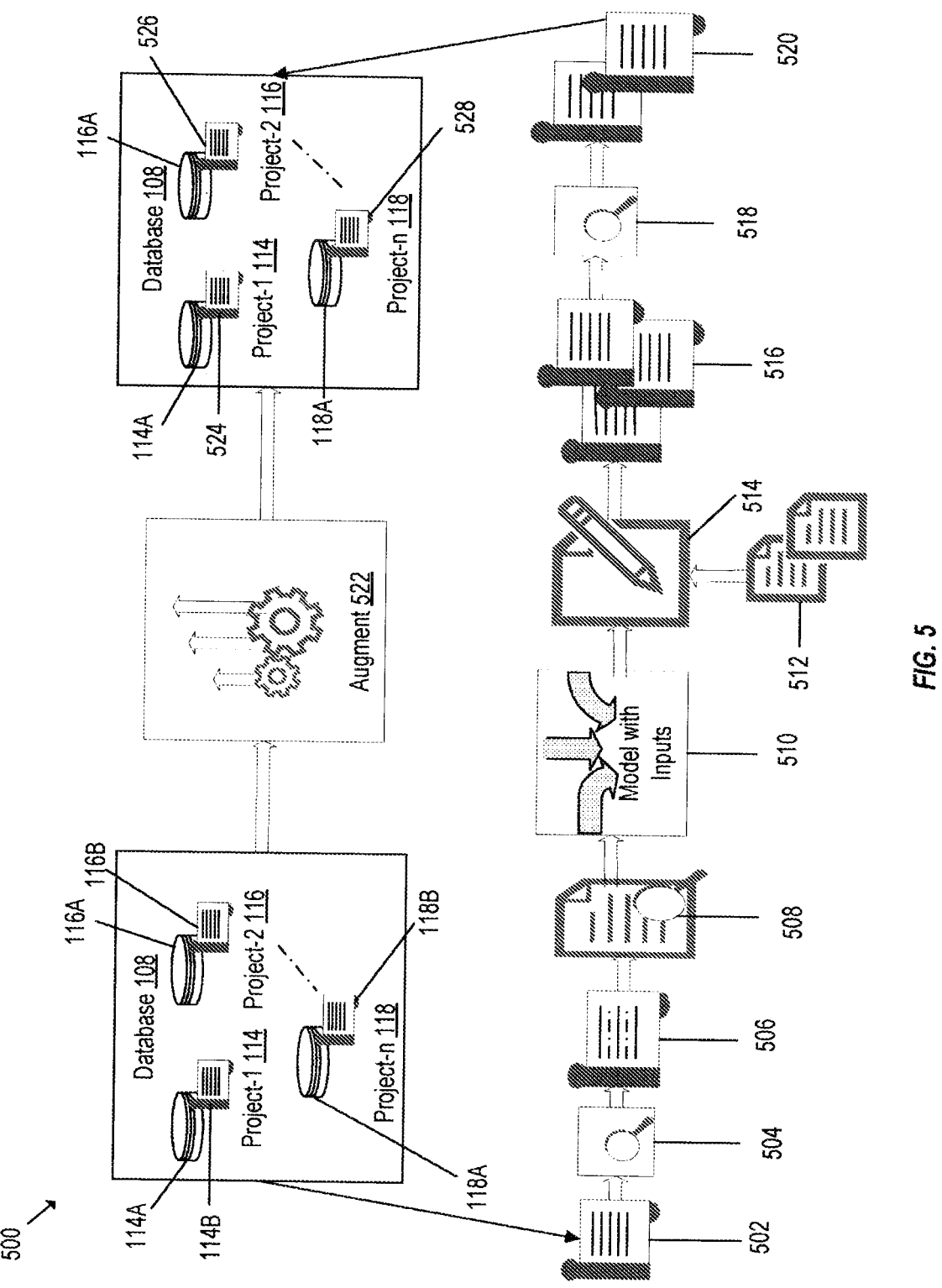
FIG. 5 is a diagram that illustrates an exemplary scenario for augmentation of machine learning pipeline corpus based on predefined machine learning pipelines.

FIG. 5 is a diagram that illustrates an exemplary scenario for augmentation of machine learning pipeline corpus based on predefined machine learning pipelines, in accordance with at least one embodiment described in the present disclosure. FIG. 5 is described in conjunction with elements from FIG. 1, FIG. 2, FIG. 3, and FIG. 4. With reference to FIG. 5, there is shown an exemplary scenario 500. The exemplary scenario 500 may include the database 108, a first ML pipeline-502, a code snippet identifier 504, a code snippet 506, input parameters finder 508, a first ML model 510, a set of predefined models 512, an instantiation block 514, a set of second ML pipelines 516, an ML pipeline evaluator 518, one or more ML pipelines 520, and an augmentation block 522. The database 108 may include the plurality of ML projects including "n" number of ML projects such as, the ML project-1 114, the ML project-2 116, . . . and the ML project-n 118. Each of the plurality of ML projects may include a dataset and a set of ML pipelines applicable on the dataset. The ML project-1 114 may include the dataset 114A and the set of ML pipelines 114B, and the ML project-2 116 may include the dataset 116A and the set of ML pipelines 116B. Similarly, the ML project-n 118 may include the dataset 118A and the set of ML pipelines 118B.

The "n" number of ML projects shown in FIG. 5 is presented merely as an example. The plurality of the ML projects may include only two ML projects or more than "n" ML projects, without deviation from the scope of the disclosure. For the sake of brevity, only "n" ML projects have been shown in FIG. 5. However, in some embodiments, there may be more than "n" ML projects, without limiting the scope of the disclosure.

The processor 204 may be configured to receive the machine learning ML project from the plurality of ML projects stored in the ML corpus database (e.g., the database 108). Herein, each of the plurality of ML projects may include a dataset and a set of ML pipelines applicable on the dataset. The machine learning ML project may help applications to perform tasks such as prediction without being programmed to do so. The dataset may include the training dataset, the validation dataset, and the testing dataset for the corresponding machine learning (ML) project. The training dataset may be used to train the ML model corresponding to the machine learning (ML) project. The validation dataset may be used to validate the trained ML model corresponding to the machine learning (ML) project. The validation dataset may further enhance the accuracy of the training dataset and may prevent an overfitting or underfitting of the given ML model. The testing dataset may be used to test the trained ML model to check whether accuracy of the trained ML model is within allowable limits or not. The ML pipeline may be a script or a program including a sequence of operations to train an ML model for a specific ML prediction task. It may be appreciated that data scientists or developers may generate several ML pipelines and datasets and upload such ML pipelines and datasets on the Internet on various online source code and ML repositories as a knowledge base. The knowledge base may be downloaded from the Internet and may be stored in the database 108. The electronic device 102 may receive the ML project from the plurality of ML projects from the database 108. For example, the electronic device 102 may receive the ML project-1 114. Herein, the electronic device 102 may receive the dataset 114A, and the set of ML pipelines 114B corresponding to the ML project-1 114. One by one, each ML pipeline of the set of ML pipelines 114B may be mutated. For example, the first ML pipeline 502 may be selected for mutation.

The processor 204 may be configured to identify the code snippet 506 of the first ML model associated with the first ML pipeline 502. Herein, the code snippet 506 may be a portion of code of the first ML pipeline 502 that may implement the first ML model. Since only a portion of code of the first ML pipeline 502 may implement the first ML model, the particular portion may be mutated in order to obtain the second ML model. In order to identify the code snippet 506 of the first ML model associated with the first ML pipeline 502, the first ML pipeline 502 may be provided to the code snippet identifier 504. Details of identification of the code snippet 506 of the first ML model are further provided, for example, in FIG. 6A.

The processor 204 may be configured to determine the one or more input parameters associated with the identified code snippet 506 by use of the input parameters finder 508. The input parameters finder 508 may be fed with the identified code snippet 506 to determine the one or more input parameters associated with the identified code snippet 506. The one or more input parameters may include the training dataset, the testing dataset, and the hyper-parameters. In order to keep the functionality of the second ML model same as the first ML model, the one or more input parameters corresponding to the identified code snippet 506 of the first ML model may be fed to the second ML model too. Hence, the one or more input parameters of the identified code snippet 506 may be determined. The first ML model with the one or more input parameters (i.e., an ML model with input parameters) is represented as the first ML model 510, in FIG. 5. Details of the identification of the one or more input parameters associated with the identified code snippet 506 are further provided, for example, in FIG. 6A.

The processor 204 may be configured to select the second ML model from the set of predefined models 512 associated with the set of predefined ML pipelines. The set of predefined models 512 may be ML models that have already been created. The set of predefined models 512 associated with the set of predefined ML pipelines may be stored in the database 108 or may be pre-stored in the memory 206. Thus, the processor 204 may receive the set of predefined models 512 from the database 108, in case the set of predefined models 512 are stored in the database 108, or alternatively may retrieve the set of predefined models 512 from the memory 206, in case the set of predefined models 512 are pre-stored in the memory 206.

The processor 204 may be configured to instantiate, using the instantiation block 514, the selected second ML model based on the substitution of the first ML model 510 with the selected second ML model in the first ML pipeline 502. The selected second ML model may be instantiated based on a substitution of the first ML model 510 with the selected second ML model in the first ML pipeline 502. Herein, the identified code snippet 506 may be replaced with a code snippet of the selected second ML model. The one or more input parameters associated with the identified code snippet 506 may be provided to the selected second ML model. Since only the identified code snippet 506 corresponding to the first ML model 510 in the first ML pipeline 502 may be replaced with the selected second ML model, the functionality of the first ML pipeline 502 post the mutation may remain the same. After substitution of the first ML model 510 with the second ML model, the set of second ML pipelines 516 may be determined. For example, with reference to FIG. 5, the set of second ML pipelines 516 may include three ML pipelines. Details of the instantiation of the second ML model are further provided, for example, in FIG. 9.

The processor 204 may be configured to select the one or more ML pipelines from the determined set of second ML pipelines 516 based on the performance score associated with each of the determined set of second ML pipelines 516. The ML pipeline evaluator 518 may determine the performance score associated with each of the determined set of second ML pipelines 516. The performance score associated with each of the determined set of second ML pipelines 516 may correspond to at least one of: the F1-score or the R2-score associated with the corresponding ML pipeline. In an embodiment, the selected one or more ML pipelines from the determined set of second ML pipelines 516 may include one of, but may not be limited to, an ML pipeline, from the determined set of second ML pipelines 516, associated with a maximum performance score; a first group of ML pipelines, from the determined set of second ML pipelines 516 that correspond to a performance score above a threshold; or second group of ML pipelines, from the determined set of second ML pipelines 516 that correspond to a predefined number of top ML pipelines based on the performance score. With reference to FIG. 5, the determined set of second ML pipelines 516 contains three ML pipeline. The selected one or more ML pipelines 520 may include two ML pipelines (e.g., top two ML pipelines) selected from the determined set of second ML pipelines 516 based on the performance score of each of the ML pipeline. The selection of the one or more ML pipelines from the determined set of second ML pipelines 516 is described further, for example, in FIG. 3.

The processor 204 may augment the database 108, using the augment block 522, to include the selected one or more ML pipelines 520 and the set of first ML pipelines 502 associated with the received ML project-1 114. Once the one or more ML pipelines 520 are selected, the processor 204 may add the selected one or more ML pipelines 520 to the database 108 in order to improve the quality of the database 108. In an embodiment, the electronic device 102 may add the selected one or more ML pipelines 520 along with the set of first ML pipelines 502 to the database 108. In another embodiment, the electronic device 102 may replace the first ML pipelines 502 with the selected one or more ML pipelines 520 in the database 108. Similarly, each of the first ML pipeline associated with the each of the plurality of ML projects, such as the ML project-1 114, the ML project-2 116, and the ML project-n 118 may be mutated and their corresponding selected one or more ML pipelines may be added to augment the database 108. With reference to FIG. 5, after augmentation the set of ML pipelines 114B corresponding to the ML project-1 114 may be changed to a set of ML pipelines 524, the set of ML pipelines 116B corresponding to the ML project-2 116 may be changed to a set of ML pipelines 526, and the set of ML pipelines 118B corresponding to the ML project-n 118 may be changed to a set of ML pipelines 528. The augmentation of the database 108 may be then used to provide higher-quality and more consistent learning pipelines/features to the meta-learning model 102A to learn from the corpus and subsequently synthesize new higher-quality ML pipelines for other datasets.

It should be noted that the scenario 500 of FIG. 5 is for exemplary purposes and should not be construed to limit the scope of the disclosure.

Figure 6A:
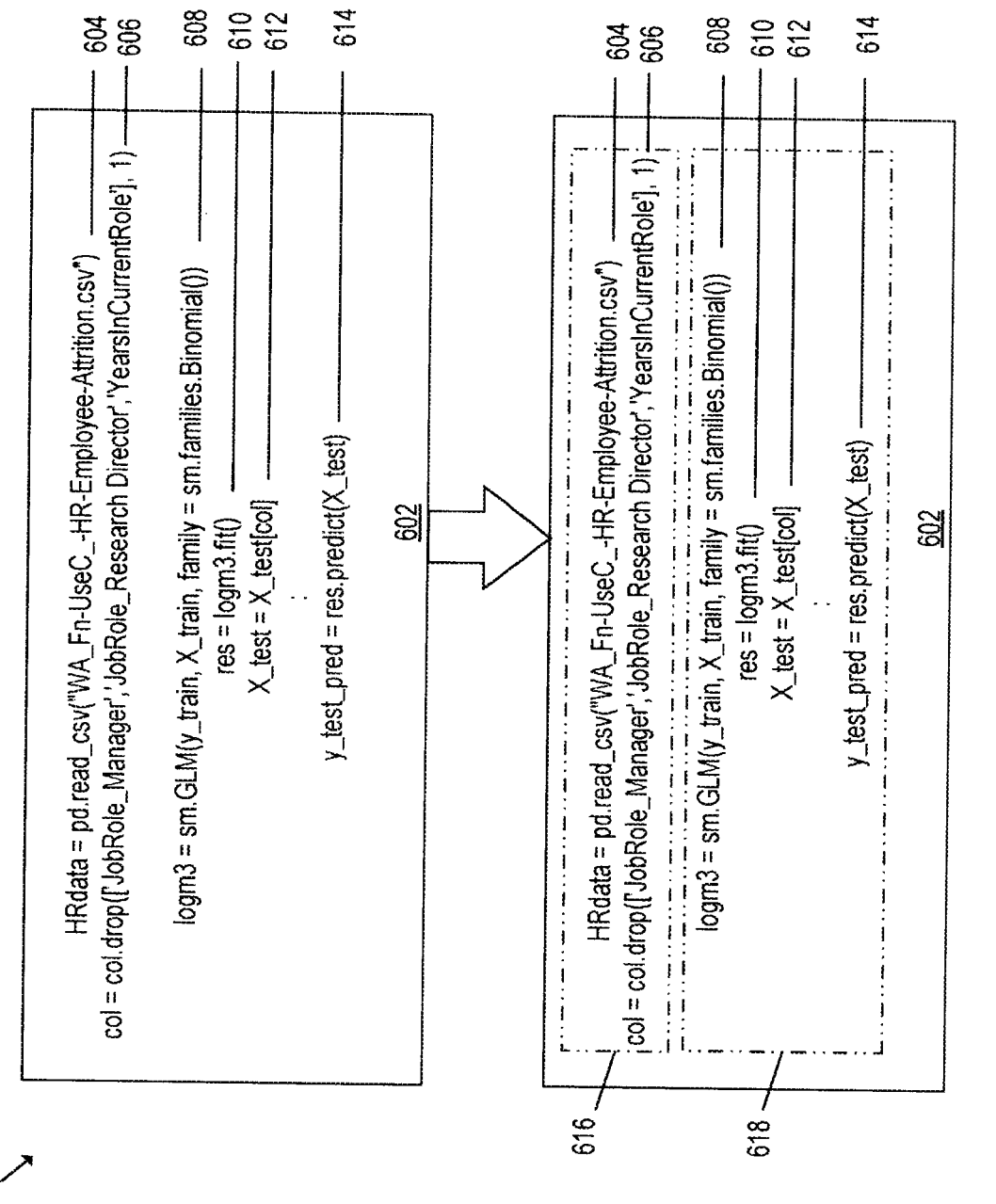
FIG. 6A is a diagram that illustrates an exemplary scenario of an identification of a code snippet of a first ML model associated with an exemplary first ML pipeline.

FIG. 6A is a diagram that illustrates an exemplary scenario of an identification of a code snippet of a first ML model associated with an exemplary first ML pipeline, in accordance with an embodiment of the disclosure. FIG. 6A is described in conjunction with elements from FIG. 1, FIG. 2, FIG. 3, FIG. 4, and FIG. 5. With reference to FIG. 6A, there is shown an exemplary scenario 600A. The exemplary scenario 600A may include a first ML pipeline 602. The first ML pipeline 602 may include a statement-1 604, a statement-2 606, a statement-3 608, a statement-4 610, a statement-5 612, and a statement-6 614. The electronic device 102 or the processor 204 may identify a code snippet of a first ML model associated with the first ML pipelines 602, as described herein.

The processor 204 may determine one or more input parameters corresponding to the first ML pipeline 602. For example, with reference to FIG. 6A, the determined one or more input parameters may include "X_train", "X_test", "y_train", and "y_test". All the assignment expressions may correspond to key-value pairs associated with a set of hyper-parameters. For example, "family=smfamilies.Binomial( )" may correspond to a hyper-parameter key-value pair that may define the first ML model based on a Binomial distribution. API level information may be used to map existing variables to "X_train", "X_test", "y_train", and "y_test". With reference to FIG. 6A, the first ML pipeline 602 may be divided into a code snippet 616, and a code snippet 618. The code snippet 616 may correspond to irrelevant portions of the first ML pipeline 602 associated with the first ML model. The code snippet 618 may correspond to the first ML model associated with the first ML pipeline-602. The processor 204 may identify the code snippet 618 corresponding to the first ML model associated with the first ML pipeline 602 and may identify the code snippet 616 as an irrelevant portion associated with the first ML pipeline 602. Hence, the processor 204 may only extract the code snippet 618 corresponding to the first ML model associated with the first ML pipeline 602 for instantiation. For example, with reference to FIG. 6A, the first ML model may be identified based on the statement-3 608 and the statement-4 610 in the code snippet 618. Details of the identification of the code snippet of first ML model are further provided, for example, in FIG. 8.

Figure 6B:
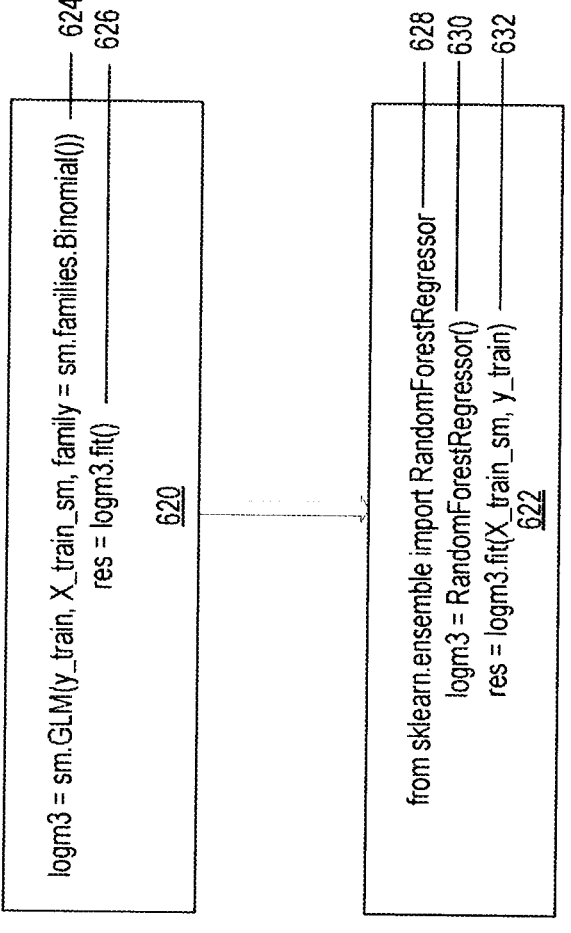
FIG. 6B is a diagram that illustrates an exemplary scenario for instantiation of a selected second ML model from a set of predefined models associated with a set of predefined ML pipelines.

FIG. 6B is a diagram that illustrates an exemplary scenario for instantiation of a selected second ML model from a set of predefined models associated with a set of predefined ML pipelines, in accordance with an embodiment of the disclosure. FIG. 6B is described in conjunction with elements from FIG. 1, FIG. 2, FIG. 3, FIG. 4, FIG. 5, and FIG. 6A. With reference to FIG. 6B, there is shown an exemplary scenario 600B. The exemplary scenario 600B may include a code snippet 620, and a code snippet 622. The code snippet 620 may include a statement-7 624 and a statement-8 626. The code snippet 620 may include a statement-9 628, a statement-10 630, and a statement-11 632. The electronic device 102 or the processor 204 may instantiate a selected second ML model from a set of predefined models associated with the set of predefined ML pipelines, as described herein.

With reference to FIG. 6B, the selected second ML model may be instantiated based on the substitution of the first ML model with the selected second ML model. The code snippet 620 may correspond to the first ML model associated with the first ML pipeline. The code snippet 622 may to correspond the second selected ML model. The processor 204 may instantiate the selected second ML model based on a substitution the code snippet 620 (including the statement-7 624 and the statement-8 626) with the code snippet 622 (including the statement-9 628, the statement-10 630, and the statement-11 632) in the first ML pipeline. Thus, the first ML model may be replaced by the second ML model in the first ML pipeline for the instantiation. It may be noted that the one or more input parameters of the first ML model, that may be determined for the code snippet 620 may be fed as input parameters to the second ML model, as defined by the code snippet 622. For example, with reference to FIG. 6B, the one or more input parameters may be "y_train", and "X_train_sm". The instantiation of the selected second ML model may lead to a determination of the set of second ML pipelines. Details of the instantiation of the selected second ML model are further provided, for example, in FIG. 7.

With reference to FIGS. 6A, and 6B, it may be noted that although the exemplary scenarios 600A and 600B have been illustrated in a high-level programming language (e.g., "Python" programming language) by use of a web-based computational notebooks, the teachings of the disclosure may be valid for other ML pipelines written in different languages and development platforms. It may be further noted that the web-based computational notebooks may correspond to computational structures, that may be used to develop/represent ML pipelines, especially during the development phase. For example, a web-based computational notebook may be used to develop a script portion (e.g., an ML pipeline) of an ML project.

It should be noted that the scenarios 600A and 600B of FIGS. 6A and 6B, respectively, are for exemplary purposes and should not be construed to limit the scope of the disclosure.

FIG. 7 is a diagram that illustrates a flowchart of an example method for instantiation of the selected second ML model from a set of predefined models associated with a set of predefined ML pipelines, in accordance with at least one embodiment described in the present disclosure. FIG. 7 is described in conjunction with elements from FIG. 1, FIG. 2, FIG. 3, FIG. 4, FIG. 5, FIG. 6A, and FIG. 6B. With reference to FIG. 7, there is shown a flowchart 700. The method illustrated in the flowchart 700 may start at block 702 and may be performed by any suitable system, apparatus, or device, such as by the example electronic device 102 of FIG. 1 or the processor 204 of FIG. 2. Although illustrated with discrete blocks, the steps and operations associated with one or more of the blocks of the flowchart 700 may be divided into additional blocks, combined into fewer blocks, or eliminated, depending on the particular implementation.

At block 702, a predefined template associated with the second ML model may be selected. The selected predefined template may be annotated with the one or more input parameters of the identified code snippet of the first ML model. The processor 204 may be configured to select the predefined template associated with the second ML model. Herein, the predefined template associated with the second ML model may be different from a template associate with the first ML model. In order to keep functionalities of the second ML mode same as the functionalities of the first ML model, one or more input parameters of the identified code snippet of the first ML model may be fed to the predefined template associated with the second ML model. For example, with reference to FIG. 6B, the code snippet 620 may be the identified code snippet of the first ML model. Herein, the one or more input parameters may include "y_train", and "X_train_sm". The code snippet 620 may further include a hyper-parameter that may define a family of distributions (e.g., a Binomial distribution family) associated with the first ML model, as provided in the statement-7 624. The template associate with the first ML model may perform regression based on a Binomial distribution. The predefined template associated with the second ML model may include a "RandomForestRegressor" function call (as per the statement-9 628 and statement-10 630 of the code snippet 622), instead of the function call associated with a "Binomial" distribution family to perform regression. Moreover, the input parameters "y_train", and "X_train_sm" may be passed as parameters to the predefined template associated with the second ML model at the statement-11 632 in order to keep the functionalities of the second ML model same as the functionalities of the first ML model.

At block 704, a code snippet of the second ML model may be constructed based on a parameterization of one or more function calls in the selected predefined template using the annotated one or more input parameters. The processor 204 may be configured to construct the code snippet of the second ML model constructed based on the parameterization of one or more function calls in the selected predefined template using the annotated one or more input parameters. Herein, parameterization may be used to pass values of the annotated one or more input parameters to the one or more function calls in the selected predefined template. In other words, previously collected variable names pointing to appropriate holes in the selected predefined template may be plugged to construct a new model snippet, such as the code snippet 622 of the second ML model. For example, with reference to FIG. 6B, the code snippet 622 of the second ML model may include the "RandomForestRegressor" as the function call. Herein, the statement-9 628 may call the "RandomForestRegressor" function, that may be defined in a library "sklearn.ensemble". The statement-10 630 of the code snippet 622 may assign the "RandomForestRegressor" function to the variable "log m3". As shown in statement-11 632, the annotated one or more input parameters, such as, "y_train", and "X_train_sm" may be passed into a "fit" function call associated with the variable "log m3" to construct the code snippet 622 of the second ML model.

At block 706, the identified code snippet 620 of the first ML model may be replaced with the constructed code snippet 622 of the second ML model to instantiate the second ML model. The processor 204 may be configured to replace the identified code snippet 620 of the first ML model with the constructed code snippet of the second ML model to instantiate the second ML model. The functionalities of the second ML model may be same as the functionalities of the first ML model, as the input parameters may be same for both the first ML model and the second ML model. However, the one or more functions called in the second ML model may be different from corresponding functions called in the first ML model. Thus, the code snippet 620 of the first ML model may be replaced by the code snippet 622 associated with the second ML model to instantiate the second ML model. Control may pass to end.

Although the flowchart 700 is illustrated as discrete operations, such as 702, 704, and 706. However, in certain embodiments, such discrete operations may be further divided into additional operations, combined into fewer operations, or eliminated, depending on the particular implementation without detracting from the essence of the disclosed embodiments.

FIG. 8 is a diagram that illustrates flowchart of an example method for identification of one or more statements associated with a first ML model, in accordance with at least one embodiment described in the present disclosure. FIG. 8 is described in conjunction with elements from FIG. 1, FIG. 2, FIG. 3, FIG. 4, FIG. 5, FIG. 6A, FIG. 6B, and FIG. 7. With reference to FIG. 8 there is shown a flowchart 800. The method illustrated in the flowchart 800 may start at 802 and may be performed by any suitable system, apparatus, or device, such as by the example electronic device 102 of FIG. 1 or the processor 204 of FIG. 2. Although illustrated with discrete blocks, the steps and operations associated with one or more of the blocks of the flowchart 800 may be divided into additional blocks, combined into fewer blocks, or eliminated, depending on the particular implementation.

At block 802, an abstract syntax tree (AST) associated with the first ML pipeline may be constructed. The processor 204 may be configured to construct the abstract syntax tree (AST) associated with the first ML pipeline. It may be appreciated that the AST of a code may be a tree representation of an abstract syntactic framework of the programming language code in a formal language. The AST may not include every detail of the code or syntax of the code, rather the AST may include only abstract syntax in the formal language, such as, a "while" block, an "if" statement, a "conditional branch", a "compare" statement, an "assignment" statement, a "variable name", and the like. Each node of the tree may represent a syntax construct of the code. The AST associated with the first ML pipeline may be thus constructed based on a representation of abstract syntax of statements in the first ML pipeline in the form of the formal language through the tree. The AST may help in easy manipulation and representation of the statements associated with the first ML model in the first ML pipeline. For example, with reference to FIG. 6A, the AST of the first ML pipeline 602 may be constructed.

At block 804, a last application programming interface (API) call associated with a predict function in the first ML pipeline may be determined based on the constructed AST. The processor 204 may be configured to determine a last application programming interface (API) call associated with a predict function in the first ML pipeline based on the constructed AST. It may be appreciated that the API may be used to retrieve data based on API endpoints that may be exposed by API functions. In order to receive the data, a request (also referred to as an API call) may be sent to an address associated with an API endpoint that may be exposed by an API function. The predict function may predict values based on a training of a given ML model. The predict function in the first ML pipeline may make predictions based the training of the first ML model. With reference to the FIG. 6A, the predict function in the first ML pipeline 602 may make predictions using the input parameter "X_test", in the statement-6 614. The processor 204 may determine the last API call associated with the predict function in the first ML pipeline-602 based on the constructed AST. For example, with reference to FIG. 6A, the statement-6 614 may correspond to the last API call associated with the predict function (i.e., "predict(X_test)") in the first ML pipeline 602.

At block 806, the determined last API call may be assigned as a target line. The processor 204 may be configured to assign the determined last API call as the target line. The target line may be the line in the first ML pipeline that includes the predict function. The target line may be the line based on which a prediction output of the first ML model may be retrieved. For example, with reference to FIG. 6A, the statement-6 614 of the first ML pipeline 602 may include the predict function and thus may be set as the target line.

At block 808, the one or more statements associated with the first ML model may be identified based on the assigned target line. The processor 204 may be configured to identify the one or more statements associated with the first ML model based on the assigned target line. As discussed, in order to instantiate the second ML model only a code snippet including statements associated with the first ML model may be replaced. Hence, statements associated with the first ML model may need to be identified in the first ML pipeline. For example, with reference to FIG. 6A, the statement-3 608, the statement-4 610, and the statement-5 612 along with the statement-6 614 of the first ML pipeline 602 may be identified as the one or more statements associated with the first ML model based on the assigned target line, which may be the statement-6 614. Thus, the code snippet 618 may include the one or more statements associated with the first ML model. Rest of the statements such as, the statement-1 604, and the statement-2 606 may not be associated with the first ML model and may be grouped together as the code snippet 616. Once, the code snippet 618 including the one or more statements associated with the first ML model is identified, the second ML model may be instantiated based on a substitution of the one or more statements of the first ML model with equivalent statements of the second ML model using the same input parameters. Herein, the statements of the code snippet 616 may remain unchanged.

In an embodiment, the one or more statements associated with the first ML model may be identified based on an application of a backward program slicing from the assigned target line until a model declaration associated with the first ML model is reached. Herein, the backward program slicing may be used to obtain a slice of a program based on an addition of relevant statements one by one from a last statement. In other words, the backward program slicing may be used to obtain a portion of the program based on a backward traversal from the last statement. The processor 204 may identify the one or more statement associated with the first ML model by use of the backward program slicing, which may entail a backward traversal of the code statements of the first ML model from the target line until the model declaration of the first ML model may be reached. For example, with reference to FIG. 6A, the statement-6 614 may be the target line. The backward slicing program may traverse the one or more statements of the first ML model from the statement-6 614 till the model declaration of the first ML model in the first ML pipeline 602 is reached to obtain the code snippet 618. Herein, the model declaration of the first ML model may correspond to the statement-3 608. For example, the function call "sm.GLM" present in the statement-3 608 may declare the first ML model.

In an embodiment, the processor 204 may further configured to store a line number of each of the one or more statements associated with the first ML model. Herein, the one or more statements may correspond to at least one of, but not limited to, a model definition, a fit function call, or a predict function call. The model definition statement may define the first ML model associated with the first ML pipeline. It may be appreciated that in order to create an ML model, the ML model may need to be defined first. For example, with reference to FIG. 6A, the first ML model associated with the first ML pipeline 602 may be defined at the statement-3 608. The function "sm.GLM" present in the statement-3 608 may define the first ML model. The fit function call may accept input parameters (such as, a training dataset including examples of features and outputs or labels/scores associated with the training dataset) and may train the first ML model based on the provided input parameters. With reference to FIG. 6A, the fit function call associated with the first ML pipeline 602 is present in the statement-4 610. Herein the one or more input parameters corresponding to the training dataset such as, "y_train" and "X_train" may be provided. The predict function call may make predictions based on the training of a given ML model. Herein, the predict function call may provide predictions values using the trained first ML model. With reference to FIG. 6A, the predict function call associated with the first ML pipeline 602 is present in the statement-6 614. Herein, the first ML model associated with the first ML pipeline 602 may make predictions on an input parameter associated with a test dataset, such as, "X_test". The processor 204 may store the line numbers of each of the one or more statements associated with the first ML model. For example, the processor 204 may store the line number of the statement-3 608 including the model definition call, the statement-4 610 including the fit function call, and also the line numbers of the statement-5 612 and the statement-6 614 including the predict function call of the first ML pipeline 602. The storage of the line numbers of each of the one or more statements associated with the first ML mode may help in the identification of the code snippet 618 and the replacement of the code snippet 618 with an equivalent code snippet of the second ML model to instantiate the second ML model. Control may pass to end.

Although the flowchart 800 is illustrated as discrete operations, such as 802, 804, 806, and 808. However, in certain embodiments, such discrete operations may be further divided into additional operations, combined into fewer operations, or eliminated, depending on the particular implementation without detracting from the essence of the disclosed embodiments.

FIG. 9 is a diagram that illustrates a flowchart of an example method to obtain a model slice to identify a code snippet of a first ML model, in accordance with at least one embodiment described in the present disclosure. FIG. 9 is described in conjunction with elements from FIG. 1, FIG. 2, FIG. 3, FIG. 4, FIG. 5, FIG. 6A, FIG. 6B, FIG. 7, and FIG. 8. With reference to FIG. 9, there is shown a flowchart 900. The method illustrated in the flowchart 900 may start at block 902 and may be performed by any suitable system, apparatus, or device, such as by the example electronic device 102 of FIG. 1 or the processor 204 of FIG. 2. Although illustrated with discrete blocks, the steps and operations associated with one or more of the blocks of the flowchart 900 may be divided into additional blocks, combined into fewer blocks, or eliminated, depending on the particular implementation.

At block 902, the assigned target line may be retrieved from the first ML pipeline. The processor 204 may be configured to retrieve the assigned target line from the first ML pipeline. As discussed, the assigned target line may be the line in the first ML pipeline that may include the predict function. With reference to FIG. 6A, the statement-6 614 of the first ML pipeline 602 may correspond to the assigned target line as the statement-6 614 may include the predict function. The assigned target line (i.e., the statement-6 614) may be retrieved from the first ML pipeline 602.

At block 904, the retrieved target line may be added into a queue including a set of statements associated with the first ML pipeline. Herein, the set of statements associated with the first ML pipeline may be the one or more statements associated with the first ML model, which may be identified based on the assigned target line. The processor 204 may be configured to add the retrieved target line into the queue that may include the set of statements associated with the first ML pipeline. With reference to FIG. 6A, the set of statements associated with the first ML pipeline 602 in the code snippet 618 may include the statement-3 608, the statement-4 610, the statement-5 612. The queue may include the set of statements. The retrieved target line such as the statement-6 614 may be added to the queue.

At block 906, a first statement may be popped from the queue. Herein, the first statement may be the assigned target line. The processor 204 may be configured to pop the first statement from the queue. For example, with reference to FIG. 6A, the statement-6 614 may be the first statement that may be popped from the queue.

At block 908, an execution of a first set of operations 910 may be controlled to obtain a model slice associated with the first ML model from the first ML pipeline. The processor 204 may be configured to control the execution of the first set of operations 910 to obtain the model slice associated with the first ML model from the first ML pipeline. The model slice may be obtained based on a retrieval of the one or more statements associated with the first ML model from the first ML pipeline. For example, with reference to FIG. 6A, the model slice may include the statement-3 608, the statement-4 610, the statement-5 612, and the statement-6 614.

The first set of operations 910 may include operations such as, a first operation 910A, a second operation 910B, a third operation 910C, a fourth operation 910D, a fifth operation 910E, and a sixth operation 910F. The first set of operations 910 may be iteratively executed by the processor 204 based on a check whether the queue is empty. In case the queue is determined as empty, the execution of the first set of operations 910 may stop and the model slice may be obtained at an operation 912. The first set of operations 910 to obtain the model slice are described herein.

At block 910A (i.e., the first operation), one or more variables and objects may be extracted from the first statement. The processor 204 may be configured to extract the one or more variables and objects from the first statement. Herein, the one or more variables and objects may be extracted from the retrieved target line. For example, with reference to FIG. 6A, the statement-6 614 may be the first statement, which may be popped from the queue. The one or more variables and objects extracted from the statement6 614 may include "X_test".

At block 910B (i.e., the second operation), a set of second statements that occur prior to the first statement in the first ML pipeline and include at least one of the extracted one or more variables and objects may be identified. The processor 204 may be configured to identify the set of second statements that occur prior to the first statement in the first ML pipeline and include at least one of the extracted one or more variables and objects. Herein, all the statements prior to first statement in the first ML pipeline that include at least one of the extracted one or more variables and objects may be identified as the set of second statements. For example, with reference to FIG. 6A, the statement-5 612 may include the extracted one or more variables and objects such as, the "X_test" in the first ML pipeline 602. Hence, the statement-5 612 may be identified as the set of second statements.

At block 910C (i.e., the third operation), a check may be performed to determine whether a third statement of the identified set of second statements occurs prior to a model definition associated with the first ML model. The processor 204 may be configured to determine whether the third statement of the identified set of second statements occurs prior to the model definition associated with the first ML model. Herein, one of statements of the identified set of second statements may be assigned as the third statement and the processor 204 may determine whether the third statement occurs before the model definition associated with the first ML model. If it is determined that the third statement of the identified set of second statements occurs prior to a model definition associated with the first ML model, then control may pass to operation 910D, else the processor 204 may select another statement as the third statement and repeat the operation 910C. For example, with reference to FIG. 6A, the statement-5 612 may be identified as the set of second statements. Since the set of second statements includes only the statement-5 612, the statement-5 612 may be assigned as the third statement. Also, in current case, the processor 204 may determine that the first ML model may be defined at the statement-3 608 in the first ML pipeline 602.

At block 910D (i.e., the fourth operation), the third statement may be added to the queue based on the determination that the third statement occurs prior to the model definition. The processor 204 may be configured to add the third statement to the queue based on the determination that the third statement occurs prior to the model definition. Since only the statements of first ML pipeline that correspond to the first ML model may be identified as the one or more statements, if the third statement appears prior to the model definition, then the third statement may be associated with the first ML model, else the third statement may not be associated with the first ML model. Hence, if the third statement appears prior to the model definition, then the third statement may be added to the queue. For example, with reference to FIG. 6A, the statement-5 612 assigned as the third statement occurs before the model definition. The processor 204 may reach the statement-5 612 as the processor 204 executes backward trace of each statement of the code snippet 618 from the target line, i.e., the statement-6 614. Hence, the statement-5 612 may be added to the queue. The third operation 910C and the fourth operation 910D may be repeated for each of set of second statements.

At block 910E (i.e., the fifth operation), the first statement may be added to the model slice. The processor 204 may be configured to add the first statement to the model slice. Herein, the identified target statement may be added to the model slice. For example, with reference to the FIG. 6A, the statement-6 614 may be added to the model slice.

At block 910F (i.e., the sixth operation), a fourth statement may be popped from the queue as the first statement based on a determination that the queue is not empty. The processor 204 may be configured to pop the fourth statement from the queue as the first statement based on the determination that the queue is not empty. Once, the first statement may be added to the model slice, the queue may be checked to determine whether the queue includes more statements and is not empty. In case the queue is determined as empty, the model slice may be obtained to identify the code snippet of the first ML model. Further, the model slice may be displayed on the display device 208A. However, if the queue is not empty, then the fourth statement may be popped from the queue as the first statement.

At block 912, the model slice may be obtained to identify the code snippet of the first ML model based on an iterative execution of the first set of operations 910. The processor 204 may be configured to obtain the model slice to identify the code snippet (e.g., the code snippet 618 of FIG. 6A) of the first ML model based on the iterative execution of the first set of operations 910. The iterative execution may depend on the number of statements in the queue. The first set of operations 910 may pertain to operations corresponding to blocks 910A to 910F. In an example, the queue may contain three statements. Herein, the first set of operations may be executed three times to obtain the model slice. The model slice may be indicative of the code snippet of the first ML model. Control may pass to end.

Although the flowchart 900 is illustrated as discrete operations, such as 902, 904, 906, 908, 910A-910F, and 922. However, in certain embodiments, such discrete operations may be further divided into additional operations, combined into fewer operations, or eliminated, depending on the particular implementation without detracting from the essence of the disclosed embodiments.

It may be noted that an objective of automatic generation of ML pipelines may be to learn how to write an ML pipeline for a given data set through the meta-learning model 102A that may be a completely offline process. In an online setting, when the user 112 may provide a new data set to the meta-learning model 102A, the meta-learning model 102A may generate a machine learning pipeline automatically.

It may be noted that the quality of the meta-learning model 102A may depend on the quality of the ML corpus database and more specifically the ML models used in the individual ML pipelines. However, the ML pipelines that may be written by data scientists may not be the best or optimal ML models for numerous reasons, such as, an unavailability of an appropriate ML model or a lack of awareness about good ML models on part of the data scientists. Low quality ML models in the ML corpus database may negatively impact the training of the meta-learning model 102A, wherein the meta-learning model 102A may be unable to identify any learnable patterns in terms of what model is to be used for what kind of dataset. In order to mitigate the aforesaid issues, the meta-learning model 102A of the present disclosure (or the disclosed electronic device 102) may be trained on the augmented ML corpus database that may include mutated ML pipelines, which may perform better than the original ML pipelines hand-written by the data scientists.

FIG. 10 is a diagram that illustrates a flowchart of an example method for training of a meta-learning model, in accordance with at least one embodiment described in the present disclosure. FIG. 9 is described in conjunction with elements from FIG. 1, FIG. 2, FIG. 3, FIG. 4, FIG. 5, FIG. 6A, FIG. 6B, FIG. 7, FIG. 8, and FIG. 9. With reference to FIG. 10 there is shown a flowchart 1000. The method illustrated in the flowchart 1000 may start at block 1002 and may be performed by any suitable system, apparatus, or device, such as by the example electronic device 102 of FIG. 1 or the processor 204 of FIG. 2. Although illustrated with discrete blocks, the steps and operations associated with one or more of the blocks of the flowchart 1000 may be divided into additional blocks, combined into fewer blocks, or eliminated, depending on the particular implementation.

At block 1002, a set of meta-features may be extracted from the dataset associated with each of the plurality of ML projects stored in the augmented ML corpus database. The processor 204 may be configured to extract the set of meta-features extracted from the dataset associated with each of the plurality of ML projects stored in the augmented ML corpus database. It may be appreciated that features may be independent variables provided to a given ML model, that the given ML model may be required to learn. The features may include columns of a tabular dataset associated with the given ML model. The meta-features may be used to estimate performance of the given ML model. The meta-features may be predefined meta-features that may be commonly used to learn a relationship between the meta-features and an ML component. The set of meta-features may be extracted from the dataset associated with each of the plurality of ML projects stored in the augmented ML corpus database. The set of meta-features may be extracted based on an injection of a meta-feature extractor code, such as, a meta-feature method call, in an ML pipeline. For example, the dataset may be passed to the meta-features method in order to extract the set of meta-features. Details of the set of meta-features have been provided, for example, in FIG. 11.

At block 1004, a set of ML pipeline components may be extracted from the set of ML pipelines associated with each of the plurality of ML projects stored in the augmented ML corpus database. The processor 204 may be configured to extract the set of meta-features from the dataset associated with each of the plurality of ML projects stored in the augmented ML corpus database. It may be appreciated that the ML components may include functions used in an ML pipeline of a given ML model. ML components from the set of ML pipelines associated with each of the plurality of ML projects, that may be stored in the augmented ML corpus database, may be extracted using an ML component extractor. Details of the extraction of the set of ML pipeline components have been provided, for example, in FIG. 11.

At block 1006, the meta-learning model 102A may be trained based on the extracted set of meta-features and the extracted set of ML pipeline components. The processor 204 may be configured to train the meta-learning model 102A based on the extracted set of meta-features and the extracted set of ML pipeline components. The meta-learning model 102A may use meta-learning algorithms that may train the meta-learning model 102A based on already trained learning algorithms. Herein, an output of other learning algorithms for a given dataset along with the learning algorithms applicable on the dataset may be provided to the meta-learning model 102A. The meta-learning model 102A may learn from the output of the other learning algorithms. For example, the meta-learning model 102A may learn and predict based on the output of the other learning algorithms as an input. Thus, the meta-learning model 102A may learn to make predictions from predictions already made by other learning algorithms.

It may be noted that the meta-learning model 102A may not be a single ML model internally but may include a plurality of ML models. For simplicity, the meta-learning model 102A may be considered as a black box that may receive a dataset as an input and may generate an abstract pipeline as an output. Herein, the abstract pipeline may be a sequence of labels that may be converted to code. It may be appreciated that the labels may be names given to a function, a module, or a sequence of statements to do a certain task. It may be noted that each of the set of ML pipelines associated with each of the plurality of ML projects stored in the augmented ML corpus database may include several components, which may be in the form of code in the corresponding ML pipeline such that developers may not write functionality of each of the component. A user may not be able to deduce anything from the corresponding ML pipeline unless the ML pipeline may be split into components that may be assigned with unique labels. Explanation augmentation may be used as a technique to provide natural language explanation of the components used in the corresponding ML pipeline.

The meta-learning model 102A may be trained based on the extracted set of meta-features and the extracted set of ML pipeline components. As the meta-learning model 102A may be trained based on the extracted set of meta-features and the extracted set of ML pipeline components from the augmented ML corpus database, hence, the quality of the meta-learning model 102A may be directly dependent on the quality and robustness of the augmented ML corpus database. Details of the meta-learning model 102A have been provided for example, in FIG. 11. Control may pass to end.

Although the flowchart 1000 is illustrated as discrete operations, such as 1002, 1004, and 1006. However, in certain embodiments, such discrete operations may be further divided into additional operations, combined into fewer operations, or eliminated, depending on the particular implementation without detracting from the essence of the disclosed embodiments.

Figure 11:
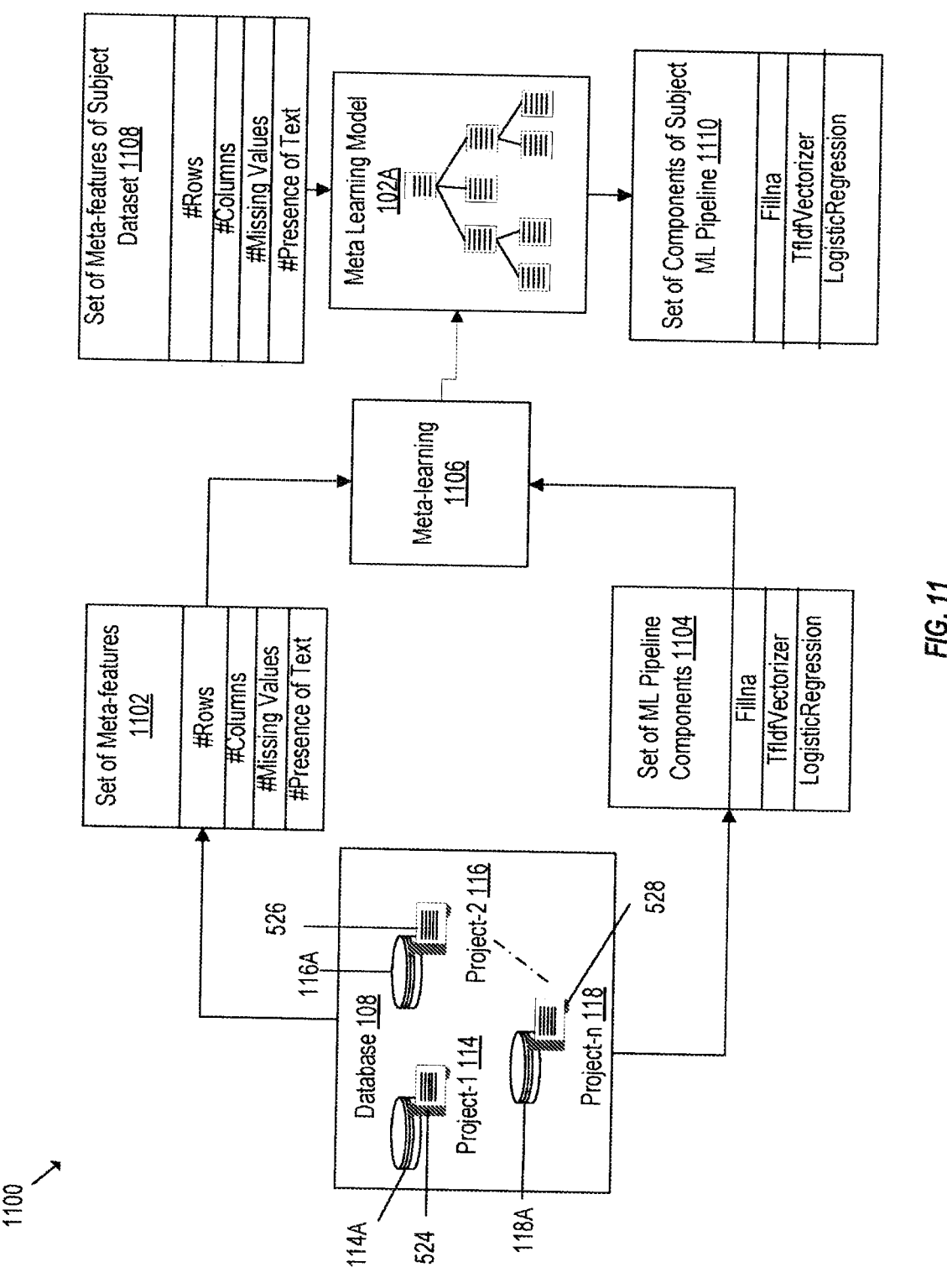
FIG. 11 illustrates an exemplary scenario of training of a meta-learning model; all according to at least one embodiment described in the present disclosure.

FIG. 11 illustrates an exemplary scenario of training of a meta-learning model, in accordance with at least one embodiment described in the present disclosure. FIG. 11 is described in conjunction with elements from FIG. 1, FIG. 2, FIG. 3, FIG. 4, FIG. 5, FIG. 6A, FIG. 6B, FIG. 7, FIG. 8, FIG. 9, and FIG. 10. With reference to FIG. 11, there is shown an exemplary scenario 1100. The exemplary scenario 1100 may include the database 108, a set of meta-features 1102, a set of ML pipeline components 1104, a meta-learning block 1106, a set of meta-features of a subject dataset (denoted by 1108), the meta-learning model 102A, and a set of components of a subject ML pipeline (denoted by 1110). The database 108 may include "n" number of ML projects such as, the ML project-1 114, the ML project-2 116, . . . and the ML project-n 118. Each of the plurality of ML projects may include the dataset and the set of ML pipelines applicable on the dataset. For example, the ML project-1 114 may include the dataset 114A and the set of ML pipelines 114B, while the ML project-2 116 may include the dataset 116A and the set of ML pipelines 116B. Similarly, the ML project-n 118 may include the dataset 118A and the set of ML pipelines 118B.

The "n" number of ML projects shown in FIG. 11 is presented merely as an example. The plurality of the ML projects may include only two ML projects or more than "n" ML project, without deviation from the scope of the disclosure. For the sake of brevity, only "n" ML projects have been shown in FIG. 11. However, in some embodiments, there may be more than "n" ML projects, without limiting the scope of the disclosure.

For example, with reference to FIG. 11, the processor 204 may extract the set of meta-features 1102 from the dataset associated with each of the plurality of ML projects stored in the augmented ML corpus database (which may be stored in the database 108). The set of meta-features 1102 may be extracted based on an injection of the meta-feature extractor such as, the meta-features method call, in the corresponding ML pipeline code. The dataset may be passed to the meta-features method in order to extract the set of meta-features 1102. In an example, the set of meta-features 1102 may include rows, columns, missing values, and a flag indicative of a presence of text.

The processor 204 may extract the set of ML pipeline components 1104 from the set of ML pipelines associated with each of the plurality of ML projects stored in the augmented ML corpus database (e.g., the database 108). For example, the processor 204 may extract the set of ML pipeline components 1104 from the set of ML pipelines 524 associated with the first ML project-1 114, the set of ML pipelines 526 associated with to the ML project-2 116, and the set of ML pipelines 528 corresponding to the nth ML project-n 118. In an example, the set of ML pipeline components 1104 may include "fillna", "TfidfVectorizer", and "logisticregression". Herein, the "fillna" may be a function used to fill missing values in rows of the dataset. The "TfidfVectorizer" may be a term-frequency inverse-document frequency function that may transform texts into meaningful numerical values, based on a number of occurrences of a term in a document in comparison to a number of documents that include the term. The logisticregression may be a function to predict values based on a logistic regression technique.

The meta-learning block 1106 may provide the extracted set of meta-features 1102 and the extracted set of ML pipeline components 1104 for the training of the meta-learning model 102A. As the set of ML pipeline components 1104 may be extracted from the augmented ML corpus database (e.g., the database 108) that may include good quality mutated ML pipelines, the meta-learning model 102A may be trained well.

Once, the meta-learning model 102A may be trained, the processor 204 may provide the set of meta-features of the subject dataset (denoted by 1108) such as, rows, columns, missing values, and a flag indicative of the presence of text to the meta-learning model 102A. The meta-learning model 102A may generate the set of components of the subject ML pipeline (denoted by 1110), such as, "fillna", "TfidfVectorizer", and "logisticregression" based on the set of meta-features of the subject dataset (denoted by 1108). As the meta-learning model 102A may be trained based on good quality mutated ML pipelines from the augmented ML corpus database (e.g., the database 108), the generated set of components of the subject ML pipeline (denoted by 1110) may also be of good quality. Thus, the generated set of components of the subject ML pipeline (denoted by 1110) may perform well for the subject dataset associated with the subject ML pipeline.

An exemplary experimental setup for the disclosure is presented in Table 1, as follows:

TABLE 1

| Exemplary experimental setup of the disclosure | |
| --- | --- |
| Dataset and Experimental setup | Values |
| Number of machine learning models used | 18 |
| Meta-learning model used | Ensemble of logistic regression and support vector machines (SVM) |
| Number of datasets in the training corpus | 170 |
| Number of benchmarks used | 39 benchmarks including 28 classification and 11 regression tasks |

It should be noted that data provided in Table 1 may merely be taken as experimental data and may not be construed as limiting the present disclosure.

An exemplary experiment data of the validation of performance improvement on training data is presented in Table 2, as follows:

TABLE 2

| Exemplary experimental data of performance improvement on training data | |
| --- | --- |
| Percentage of ML pipelines | Performance improvement in percentage |
| 17% | >5% |
| 11% | >3% |
| 13% | >1% |
| 21% | >0% |
| 38% | No improvement |

From Table 2, it may be observed that out of a total of a 170 ML pipelines, for 62 percent of the ML pipelines, an accuracy increased based on the proposed mutation framework. For 17 percent of the ML pipelines, the performance improvement may be more than 5 percentage, which is significant. Further, for 13 percent of the ML pipelines, the performance improvement may be more than 1 percentage.

It should be noted that data provided in Table 2 may merely be taken as experimental data and may not be construed as limiting the present disclosure.

An exemplary experiment data of impact on test data is presented in Table 3, as follows:

TABLE 3

| Exemplary experimental data of impact on test data | |
| --- | --- |
| Metric | Value |
| Average F1/R2 | 0.023 |
| >0.5 | 3 |
| >0.01 | 5 |
| >0 | 7 |

It should be noted that data provided in Table 3 may merely be taken as experimental data and may not be construed as limiting the present disclosure.

Various embodiments of the disclosure may provide one or more non-transitory computer-readable storage media configured to store instructions that, in response to being executed, cause a system (such as, the example electronic device 102) to perform operations. The operations may include receiving a machine learning (ML) project from a plurality of ML projects stored in an ML corpus database. Herein, each of the plurality of ML projects may include a dataset and a set of ML pipelines applicable on the dataset. The operations may further include mutating a first ML pipeline, of a set of first ML pipelines associated with the received ML project, to determine a set of second ML pipelines, based on a set of predefined ML pipelines. Herein, the mutation of the first ML pipeline may correspond to a substitution of a first ML model associated with the first ML pipeline with a second ML model associated with one of the sets of predefined ML pipelines. The operations may further include selecting one or more ML pipelines from the determined set of second ML pipelines based on a performance score associated with each of the determined set of ML pipelines. The operations may further include augmenting the ML corpus database to include the selected one or more ML pipelines and the set of first ML pipelines associated with the received ML project.

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations or a combination of software and specific hardware implementations are also possible and contemplated. In this description, a "computing entity" may be any computing system as previously defined in the present disclosure, or any module or combination of modulates running on a computing system.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

All examples and conditional language recited in the present disclosure are intended for pedagogical objects to aid the reader in understanding the present disclosure and the concepts contributed by the inventor to furthering the art and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A method, executed by a processor, comprising:
receiving a machine learning (ML) project from a plurality of ML projects stored in an ML corpus database, wherein each of the plurality of ML projects includes a dataset and a set of ML pipelines applicable on the dataset;
mutating a first ML pipeline, of a set of first ML pipelines associated with the received ML project, to determine a set of second ML pipelines, based on a set of predefined ML pipelines,
wherein the mutation of the first ML pipeline corresponds to a substitution of a first ML model, associated with the first ML pipeline, with
a second ML model associated with one of the set of predefined ML pipelines;
selecting one or more ML pipelines from the determined set of second ML pipelines based on a performance score associated with each of the determined set of second ML pipelines;
augmenting the ML corpus database to include the selected one or more ML pipelines and the set of first ML pipelines associated with the received ML project;
constructing an abstract syntax tree (AST) associated with the first ML pipeline;
determining a last application programming interface (API) call associated with a predict function in the first ML pipeline based on the constructed AST;
assigning the determined last API call as a target line; and
identifying one or more statements associated with the first ML model based on the assigned target line.

2. The method according to claim 1, further comprising:
extracting a set of meta-features from the dataset associated with each of the plurality of ML projects stored in the augmented ML corpus database;
extracting a set of ML pipeline components from the set of ML pipelines associated with each of the plurality of ML projects stored in the augmented ML corpus database; and training a meta-learning model based on the extracted set of meta- features and the extracted set of ML pipeline components.

3. The method according to claim 1, wherein the performance score associated with each of the determined set of second ML pipelines corresponds to at least one of: an F1-score or an R2-score associated with the corresponding ML pipeline.

4. The method according to claim 1, wherein the selected one or more ML pipelines from the determined set of second ML pipelines includes one of:
an ML pipeline, from the determined set of second ML pipelines, associated with a maximum performance score, a first group of ML pipelines, from the determined set of second ML pipelines, that correspond to a performance score above a threshold, or a second group of ML pipelines, from the determined set of second ML pipelines, that correspond to a predefined number of top ML pipelines based on the performance score.

5. The method according to claim 1, further comprising:
identifying a code snippet of the first ML model associated with the first ML pipeline;
determining one or more input parameters associated with the identified code snippet;
selecting the second ML model from a set of predefined models associated with the set of predefined ML pipelines; and
instantiating the selected second ML model based on the substitution of the first ML model with the selected second ML model in the first ML pipeline.

6. The method according to claim 5, wherein the determined one or more input parameters associated with the identified code snippet comprises at least one of: a training dataset, a test dataset, and a set of hyper-parameters associated with the first ML model.

7. The method according to claim 5, further comprising:
selecting a predefined template associated with the second ML model, the selected predefined template is annotated with the one or more input parameters of the identified code snippet of the first ML model;
constructing a code snippet of the second ML model based on a parameterization of one or more function calls in the selected predefined template using the annotated one or more input parameters; and
replacing the identified code snippet of the first ML model with the constructed code snippet of the second ML model to instantiate the second ML model.

8. The method according to claim 1, wherein the one or more statements associated with the first ML model are identified based on an application of a backward program slicing from the assigned target line until a model declaration associated with the first ML model is reached.

9. The method according to claim 1, further comprising storing a line number of each of the one or more statements associated with the first ML model,
wherein the one or more statements correspond to at least one of: a model definition, a fit function call, or a predict function call.

10. The method according to claim 1, further comprising:
retrieving the assigned target line from the first ML pipeline;
adding the retrieved target line into a queue including a set of statements associated with the first ML pipeline;
popping a first statement from the queue;

controlling an execution of a first set of operations to obtain a model slice associated with the first ML model from the first ML pipeline, wherein the first set of operations includes:

extracting one or more variables and objects from the first statement, identifying a set of second statements that occur prior to the first statement in the first ML pipeline and include at least one of the extracted one or more variables and objects, determining whether a third statement of the identified set of second statements occurs prior to a model definition associated with the first ML model, adding the third statement to the queue based on the determination that the third statement occurs prior to the model definition, adding the first statement to the model slice, and popping a fourth statement from the queue as the first statement, based on a determination that the queue is not empty; and obtaining the model slice to identify a code snippet of the first ML model associated with the first ML pipeline, based on an iterative execution of the first set of operations.

11. One or more non-transitory computer-readable storage media configured to store instructions that, in response to being executed, cause an electronic device to perform operations, the operations comprising:

receiving a machine learning (ML) project from a plurality of ML projects stored in an ML corpus database, wherein each of the plurality of ML projects includes a dataset and a set of ML pipelines applicable on the dataset;

mutating a first ML pipeline, of a set of first ML pipelines associated with the received ML project, to determine a set of second ML pipelines, based on a set of predefined ML pipelines, wherein the mutation of the first ML pipeline corresponds to a substitution of a first ML model, associated with the first ML pipeline, with a second ML model associated with one of the set of predefined ML pipelines;

selecting one or more ML pipelines from the determined set of second ML pipelines based on a performance score associated with each of the determined set of second ML pipelines;

augmenting the ML corpus database to include the selected one or more ML pipelines and the set of first ML pipelines associated with the received ML project;

constructing an abstract syntax tree (AST) associated with the first ML pipeline;

determining a last application programming interface (API) call associated with a predict function in the first ML pipeline based on the constructed AST;

assigning the determined last API call as a target line; and identifying one or more statements associated with the first ML model based on the assigned target line.

12. The one or more non-transitory computer-readable storage media according to claim 11, wherein the operations further comprise:

extracting a set of meta-features from the dataset associated with each of the plurality of ML projects stored in the augmented ML corpus database;

extracting a set of ML pipeline components from the set of ML pipelines associated with each of the plurality of ML projects stored in the augmented ML corpus database; and training a meta-learning model based on the extracted set of meta-features and the extracted set of ML pipeline components.

13. The one or more non-transitory computer-readable storage media according to claim 12, wherein the performance score associated with each of the determined set of second ML pipelines corresponds to at least one of an F1-score or an R2-score associated with the corresponding ML pipeline.

14. The one or more non-transitory computer-readable storage media according to claim 11, wherein the selected one or more ML pipelines from the determined set of second ML pipelines includes one of:

an ML pipeline, from the determined set of second ML pipelines, associated with a maximum performance score, a first group of ML pipelines, from the determined set of second ML pipelines, that correspond to a performance score above a threshold, or a second group of ML pipelines, from the determined set of second ML pipelines, that correspond to a predefined number of top ML pipelines based on the performance score.

15. The one or more non-transitory computer-readable storage media according to claim 11, wherein the operations further comprise:

identifying a code snippet of the first ML model associated with the first ML pipeline;

determining one or more input parameters associated with the identified code snippet;

selecting the second ML model from a set of predefined models associated with the set of predefined ML pipelines; and instantiating the selected second ML model based on the substitution of the first ML model with the selected second ML model in the first ML pipeline.

16. The one or more non-transitory computer-readable storage media according to claim 15, wherein the determined one or more input parameters associated with the identified code snippet comprises at least one of: a training dataset, a test dataset, and a set of hyper-parameters associated with the first ML model.

17. The one or more non-transitory computer-readable storage media according to claim 15, wherein the operations further comprise:

selecting a predefined template associated with the second ML model, the selected predefined template is annotated with the one or more input parameters of the identified code snippet of the first ML model;

constructing a code snippet of the second ML model based on a parameterization of one or more function calls in the selected predefined template using the annotated one or more input parameters; and replacing the identified code snippet of the first ML model with the constructed code snippet of the second ML model to instantiate the second ML model.

18. An electronic device, comprising:

a memory storing instructions; and a processor, coupled to the memory, that executes the instructions to perform a process comprising:

receiving a machine learning (ML) project from a plurality of ML projects stored in an ML corpus database, wherein each of the plurality of ML projects includes a dataset and a set of ML pipelines applicable on the dataset;

mutating a first ML pipeline, of a set of first ML pipelines associated with the received ML project, to determine a set of second ML pipelines, based on a set of predefined ML pipelines, wherein the mutation of the first ML pipeline corresponds to a substitution of a first ML model, associated with the first ML pipeline, with a second ML model associated with one of the set of predefined ML pipelines;

selecting one or more ML pipelines from the determined set of second ML pipelines based on a performance score associated with each of the determined set of second ML pipelines;

augmenting the ML corpus database to include the selected one or more ML pipelines and the set of first ML pipelines associated with the received ML project;

constructing an abstract syntax tree (AST) associated with the first ML pipeline;

determining a last application programming interface (API) call associated with a predict function in the first ML pipeline based on the constructed AST;

assigning the determined last API call as a target line; and identifying one or more statements associated with the first ML model based on the assigned target line.

* * * * *